United States Patent
Asada et al.

(10) Patent No.: US 11,884,788 B2
(45) Date of Patent: Jan. 30, 2024

(54) REINFORCING FIBER, METHOD FOR MANUFACTURING SAME, AND MOLDED BODY USING SAME

(71) Applicant: KURARAY CO., LTD., Kurashiki (JP)

(72) Inventors: Toru Asada, Okayama (JP); Daisuke Koda, Kamisu (JP); Shuhei Yorimitsu, Okayama (JP); Shinichi Takemoto, Okayama (JP); Hiroyuki Kawai, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 171 days.

(21) Appl. No.: 17/433,717

(22) PCT Filed: Feb. 21, 2020

(86) PCT No.: PCT/JP2020/007220
§ 371 (c)(1),
(2) Date: Aug. 25, 2021

(87) PCT Pub. No.: WO2020/175404
PCT Pub. Date: Sep. 3, 2020

(65) Prior Publication Data
US 2022/0049062 A1 Feb. 17, 2022

(30) Foreign Application Priority Data
Feb. 27, 2019 (JP) .................................. 2019-034453

(51) Int. Cl.
*C08J 5/24* (2006.01)
*D06M 15/693* (2006.01)

(52) U.S. Cl.
CPC .............. *C08J 5/246* (2021.05); *C08J 5/249* (2021.05); *D06M 15/693* (2013.01); *C08J 2309/00* (2013.01)

(58) Field of Classification Search
CPC ..... C08J 5/246; C08J 5/249; C08J 5/06; C08J 2309/00; C08J 2323/16; C08J 2401/02; C08J 2467/00; C08J 2475/04; C08J 2477/06; D06M 15/693; F16G 5/08; F16G 5/20; F16G 1/10; C08L 23/16
USPC ................................................. 428/394, 384
See application file for complete search history.

(56) References Cited

U.S. PATENT DOCUMENTS

| | | | |
|---|---|---|---|
| 4,362,841 A | 12/1982 | Minatono et al. | |
| 2016/0289501 A1 | 10/2016 | Nakashima et al. | |
| 2017/0002190 A1 | 1/2017 | Hisasue et al. | |
| 2018/0045273 A1* | 2/2018 | Kobayashi | ............... F16G 1/28 |
| 2021/0222036 A1 | 7/2021 | Asada et al. | |

FOREIGN PATENT DOCUMENTS

| | | |
|---|---|---|
| CN | 10521580 A | 12/2015 |
| EP | 3098242 A1 | 11/2016 |
| GB | 756269 A | 9/1956 |
| IN | 202047051773 A | 12/2020 |
| JP | S53-117034 A | 10/1978 |
| JP | 54-4976 A | 1/1979 |
| JP | 58-2370 A | 1/1983 |
| JP | S60-209071 A | 10/1985 |
| JP | H02-45585 A | 2/1990 |
| JP | H07-25898 B2 | 3/1995 |
| JP | 10-195208 A | 7/1998 |
| JP | 3030466 B2 | 4/2000 |
| JP | 2001064878 A | 3/2001 |
| JP | 2001146686 A | 5/2001 |
| JP | 2006176580 * | 7/2006 |
| JP | 2011111563 A | 6/2011 |
| WO | WO-2010125992 A1 | 11/2010 |
| WO | WO-2016170747 A1 | 10/2016 |
| WO | WO-2019230700 A1 | 12/2019 |

OTHER PUBLICATIONS

Paraffin Oil, Honeywell Researh Chemicals, accessed online Apr. 10, 2023.*
Polysciences, Poly(butdiene/maleic anhydride), accessed online Apr. 10, 2023.*
Wikipedia, Chloroprene.*
Extended European Search Report dated Nov. 2, 2022 in Patent Application No. 20762349.7, 9 pages.
International Search Report dated Apr. 14, 2020 in PCT/JP2020/007220 (with English translation), 5 pages.

* cited by examiner

Primary Examiner — Camie S Thompson
(74) Attorney, Agent, or Firm — Element IP, PLC.

(57) ABSTRACT

Provided are reinforcing fibers using an adhesive component not containing resorcinol and formaldehyde, which are excellent in adhesiveness to rubber and which can be efficiently produced while preventing contamination of production facilities, and a method for producing them, as well as a molded article using them. The reinforcing fibers have an adhesive component that contains a conjugated diene rubber and an oil, in at least a part of the surfaces thereof, wherein the vapor pressure at 20° C. of the oil is 10 Pa or less.

19 Claims, No Drawings

REINFORCING FIBER, METHOD FOR MANUFACTURING SAME, AND MOLDED BODY USING SAME

TECHNICAL FIELD

The present invention relates to reinforcing fibers excellent in adhesiveness to rubber and a method for producing them, as well as a molded article using them.

BACKGROUND ART

In general, industrial rubber products such as tires, conveyor belts and hoses (e.g., hydraulic brake hoses for vehicles) are reinforced with synthetic fibers such as Ma fibers or rayon fibers, or natural fibers such as cotton fibers. In order that these products can fully express excellent physical characteristics of rubber (e.g., high strength and high elastic modulus), fibers and rubber need to be firmly bonded to each other. Heretofore, as such a method, widely known is a method of using an adhesive called RFL that contains a resorcinol-formaldehyde resin and a rubber latex as main ingredients (PTLs 1 and 2).

However, formaldehyde is suspected of carcinogenicity, and resorcinol is suspected of being an endocrine-disrupting chemical, and therefore it is desired to develop some replacements.

Specifically, PTL 3 proposes a technique of using an adhesive that contains an adhesive compound having an unsaturated carbon bond and an epoxy group capable of reacting with a vulcanizing agent for use for vulcanization of rubber. PTL 4 proposes a bonding method of using an adhesive composition for organic fiber cords that contains a (blocked) isocyanate compound and/or an amine-based curing agent (A), an epoxy compound (B) and a rubber latex (C) but does not contain a resorcinol and a formaldehyde. PTL 5 proposes a technique of dividing and thinning liquid rubber-adhered, rubber-reinforcing fibers by mechanical shear force.

CITATION LIST

Patent Literature

PTL 1: JP 54-4976 A
PTL 2: JP 58-2370 A
PTL 3: JP 2011-111563 A
PTL 4: WO2010/125992
PTL 5: JP 10-195208 A

SUMMARY OF INVENTION

Technical Problem

The method of using an adhesive described in PTL 3 is greatly inferior to a method of using an already-existing RFL in point of adhesiveness, This includes a description of adding a blocked isocyanate for increasing adhesion force, but in this case, the blocked isocyanate is polymerized substantially on the fibers to he am adherend and therefore requires high-temperature or/and long-time heat treatment, which, however, has a risk of degrading the adherend fibers.

The method of using an adhesive described in. PTL 4 achieves an adhesion force comparable to or more than that in a method of using an already-existing RFL, but requires heat treatment substantially at a high temperature (180° C. and 240° C.) after forming an adhesive layer on the surface of an organic fiber cord. In the case of such treatment where organic fibers such as PVA fibers or PET fibers are used as reinforcing fibers, there is a risk of degradation of the reinforcing fibers to worsen the performance thereof, Further, the method described in PTL 5 is, by adhering rubber-reinforcing short fibers to a liquid rubber, to improve the dispersibility of the reinforcing fibers in kneading with rubber to thereby improve reinforcing performance, fur in this, a necessary amount of an extremely high-viscosity liquid rubber must be stably adhered to the surfaces of fibers, and therefore the method is problematic in point of productivity. Further, in the case of adhering a high-viscosity liquid rubber to the surfaces of fibers, the holding rollers through which fibers have passed may be contaminated, and there is also a problem in that the productivity lowers.

Given the situation, a bonding method is required that achieves an adhesion force on the same level as that in an already-existing method of using RFL and does not cause degradation of general fibers, and that provides a technique of efficient production with little contamination of production facilities.

The present invention has been made in consideration of the above-mentioned problems in the art and the subject matter thereof is to provide reinforcing fibers using an adhesive component not containing resorcinol and formaldehyde, excellent in adhesiveness to rubber and capable of being efficiently produced with suppressing contamination of production facilities, and a method for producing the reinforcing fibers, and also to provide a molded article using the reinforcing fibers.

Solution to Problem

The present inventors have made assiduous studies for solving the above-mentioned problems and, as a result, have found that, when a mixture of a conjugated diene rubber and an oil having a specific vapor pressure is used as an adhesive component, reinforcing fibers excellent in adhesiveness to rubber can be obtained and contamination of production facilities can be prevented even though not using resorcinol and formaldehyde, and have completed the present invention.

Specifically, the present invention relates to the following [1] to [18].

[1] Reinforcing fibers having an adhesive component that contains a conjugated diene rubber and an oil, in at least a part of the surfaces thereof, wherein the vapor pressure at 20° C. of the oil is 10 Pa or less.
[2] Reinforcing fibers according to the above [1], wherein the fibers are one or more kinds of hydrophilic fibers selected from polyvinyl alcohol fibers, regenerated cellulose fibers, and fibers prepared by hydrophilizing the surfaces of hydrophobic fibers.
[3] Reinforcing fibers according to the above [2], wherein the hydrophobic fibers are polyester fibers.
[4] Reinforcing fibers according to any of the above [1] to [3], wherein the conjugated diene rubber is liquid.
[5] Reinforcing fibers according to any of the above [1] to [4], wherein the conjugated diene rubber contains monomer units derived from one or more selected from butadiene, isoprene and farnesene in molecule.
[6] Reinforcing fibers according to any of the above [1] to [5], wherein the melt viscosity at 38° C. of the conjugated diene rubber is 4,000 Pa·s or less.

[7] Reinforcing fibers according to any of the above [1] to [6], wherein the number-average molecular weight (Mn) of the conjugated diene rubber is 2,000 or more and 120,000 or less,
[8] Reinforcing fibers according to any of the above [1] to [7], wherein the conjugated diene rubber is a modified conjugated clime rubber having a hydrogen-bonding functional group in a part of the conjugated diene rubber.
[9] Reinforcing fibers according to the above [8], wherein the hydrogen-bonding functional group is one or more selected from a hydroxy group, an aldehyde group, an acetalized form of an aldehyde group, a carboxy group, a. salt of a carboxy group, an ester form of a carboxy group, an acid anhydride of a carboxy group, a silanol group, an ester form of a silanol group, an amino group, an imidazole group, and a mercapto group.
[10] Reinforcing fibers according to any of the above [1] to [9], wherein the deposition amount of the adhesive component is 0.01 parts by mass or more and 10 parts by mass or less relative to 100 parts by mass of the fibers.
[11] Reinforcing fibers according to any of the above [1] to [10], wherein the content of the conjugated dime rubber in the adhesive component is 1% by mass or more and 80% by mass or less.
[12] Reinforcing fibers according to any of the above [1] to [11], wherein the content of the oil in the adhesive component is 20% by mass or more and 90% by mass or less.
[13] Reinforcing fibers according to any of the above [1] to [12], wherein the flash point of the oil is 70° C. or higher.
[14] A method for producing the reinforcing fibers of any of the above [1] to [13], including a step of adhering the conjugated diene rubber in a state mixed with the oil to fibers.
[15] A woven fabric or a knitted fabric containing the reinforcing fibers of any of the above [1] to [13] in at least a part thereof.
[16] A molded article using the reinforcing fibers of any of the above [1] to [13].
[17] The molded article according to the above [16], further containing a rubber component.
[18] The molded article according to the above [16] or [17] which is any of tires, belts or hoses, Advantageous Effects of Invention The present invention can provide reinforcing fibers using an adhesive component not containing resorcinol and formaldehyde, excellent in adhesiveness to rubber, and capable of being efficiently produced with suppressing contamination of production facilities, and a method for producing the reinforcing fibers, and also a molded article using the reinforcing fibers.

Description of Embodiments

[Reinforcing Fibers]
The reinforcing fibers of the present invention have an adhesive component that contains a conjugated diene rubber and an oil, in at least a part of the surfaces thereof, wherein the vapor pressure at 20° C. of the oil is 10 Pa or less,
According to the present invention, a conjugated diene rubber is used as the adhesive component, and therefore reinforced fibers excellent in adhesiveness to rubber can be obtained. Also in the present invention, an oil having a vapor pressure at 20° C. of 10 Pa or less is used along with the conjugated diene rubber, the convergence performance of the fibers is improved and, in addition, even after the adhesive component has been applied to the surfaces of the fibers, the oil does not evaporate away for a long period of time, and therefore, the fibers can be excellent in wear resistance, uneven coating thereof with the adhesive component hardly occurs, and the adhesiveness of the fibers can also improve. Further, since the running performance through the production lines in producing the fibers is improved, and the production facilities can be prevented from being contaminated and production efficiency is therefore bettered.

Different from a conventional art using RFL, the present invention does not require a heating step for resinification, and different from a conventional art using a solvent such as water as a diluent, the present invention does not require an evaporation step for removing water. Accordingly, as compared with those in such conventional arts, the present invention enables efficient production in simple facilities and are ecological.

In the present invention, "having an adhesive component that contains a conjugated diene rubber and an oil, in at least a part of the surfaces of fibers" may be an embodiment where an adhesive component exists in at least a part of the surfaces of fibers, for example, as a film or a layer thereof, or an embodiment where an adhesive component is contained in a raw material for fibers and the adhesive component exists in a part of the surfaces of the fibers themselves.

The adhesive component to be used in the present invention can provide reinforcing fibers excellent in adhesiveness to rubber even though not containing a resin that uses formaldehyde harmful to human bodies or uses a raw material of such formaldehyde. In the present invention, if the adhesive component contains a resin that uses formaldehyde as a raw material, examples of the resin include a resorcinol/formaldehyde resin, a phenol/formaldehyde resin, a melamine/formaldehyde resin and derivatives thereof. In the case where the adhesive component contains the formaldehyde component, the content thereof is preferably 10 parts by mass or less relative to 100 parts by mass of the conjugated diene rubber, more preferably 5 parts by mass or less, even more preferably 3 parts by mass or less, further more preferably 1 part by mass or less, and especially preferably the adhesive component does not substantially contain such a formaldehyde component. The formaldehyde content can be measured through HPLC after extraction of the adhesive component from reinforcing fibers with a solvent such as toluene.

<Conjugated Diene Rubber>
The conjugated diene rubber for use in the present invention is one containing at least a conjugated diene-derived monomer unit (hereinafter also referred to as "conjugated diene unit") in the molecule, and is, for example, preferably one containing a conjugated diene-derived monomer unit in an amount of 50 mol % or more in all the monomer units in the conjugated diene rubber.

Examples of the conjugated diene unit include butadiene, 2-methyl-1,3-butadiene (hereinafter also referred to as "isoprene"), 2,3-dimethylbutadiene, 2-phenylbutadiene, 1,3-pentadiene, 2-methyl-1,3-pentadiene, 1,3-hexadiene, 1,3-octathene, 1,3-cyclohexadiene, 2-methyl-1,3-octadiene, 1,3,7-octatriene, β-farnesene (hereinafter also referred to as "farnesene"), myrcene, and chloroprene. One alone or two or more kinds of these conjugated dienes may be used either singly or as combined. From the viewpoint of reactivity in vulcanization, more preferably, the conjugated diene rubber has monomer units derived from one or more selected from butadiene, isoprene and farnesene.

The conjugated diene rubber for use in the present invention may contain a unit derived from any other monomer than the above-mentioned conjugated diene monomer to such a degree that the other monomer unit does not interfere with adhesiveness. The other monomer includes a copolymerizable ethylenically unsaturated monomer and an aromatic vinyl compound.

Examples of the ethylenically unsaturated monomer include olefins such as ethylene, 1-butene, and isobutylene.

Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalane, 2-vinylnaphthalane, vinylanthracene, N,N-diethyl-4-aminoethylstyrene, yinylpyridine, 4-methoxystyrene, monochlorostyrene, dichlorostyrene, and divinylbenzene. One alone or two or more kinds of these may be used either singly or as combined.

In the case where the conjugated diene rubber contains a monomer unit derived from any other monomer than a conjugated diene monomer, the content thereof is preferably 30 mol % or less, more preferably 10 mol % or less, even more preferably 5 mol % or less.

The conjugated diene rubber for use in the present invention is preferably a modified conjugated diene rubber having a hydrogen-bonding functional group in a part of the conjugated diene rubber, more preferably a modified conjugated diene rubber containing a conjugated diene unit in at least a part of the polymer chain and having a hydrogen-bonding functional group in the side chain or at the end of the polymer chain.

In the case where such a modified conjugated diene rubber is used as the conjugated diene rubber, the modified conjugated diene rubber interacts with the adherends of both the rubber and the fibers to bond the two. In the case where the modified conjugated diene rubber and the adherend rubber are vulcanized to form a covalent bond, a strong cohesion force is generated to further more improve the adhesiveness.

In the case where hydrophilic fibers are used as the fibers, it is considered that the hydrogen-bonding functional group contained in the modified conjugated diene rubber may form a hydrogen bond with the hydrophilic fibers to further improve the adhesiveness.

In the present specification, "hydrogen bond" means a bonding interaction to be formed between a hydrogen atom (donor) that bonds to an atom having a large electronegativity (e.g., O, N, S) and is polarized to be electrically positivity, and an atom (acceptor) having a lone electron pair to be electrically negativity.

In the present invention, "hydrogen-bonding functional group" is a functional group that functions as a donor and an acceptor at the hydrogen bond. Specifically, it includes a hydroxy group, an ether group, a mercapto group, a carboxy group, a carbonyl group, an aldehyde group, an amino group, an imino group, an imidazole group, an urethane group, an amide group, an urea group, an isocyanate group, a nitrile group, a silanol group and derivatives thereof. A derivative of an aldehyde group includes an acetalized form thereof. A derivative of a carboxy group includes a salt thereof, an esterified form thereof, an amidated form thereof, and an acid anhydride thereof. A derivative of a silanol group includes an esterified form thereof. A carboxy group includes a group derived from a monocarboxylic acid, and a group derived from a dicarboxylic acid. Among these, one or more selected from a hydroxy group, an aldehyde group, an acetalized form of an aldehyde group, a carboxy group, a salt of a carboxy group, an esterified form of a carboxy group, an acid anhydride of a carboxy group, a silanol group, an esterified form of a silanol group, an amino group, an imidazole group and a mercapto group are preferred.

Among these, from the viewpoint of improving adhesiveness and from the viewpoint of easiness in production of conjugated diene rubber, one or more selected from a hydroxy group, a carboxy group, a carbonyl group, a salt of a carboxy group, an esterified form of a carboxy group and an acid anhydride of a carboxy group are preferred; one or more selected from a carboxy group, an esterified form of a carboxy group and an acid anhydride of a carboxy group are more preferred; and a functional group derived from an esterified form of maleic anhydride or from maleic anhydride is even more preferred.

The number of the hydrogen-bonding functional groups in the modified conjugated diene rubber is, from the viewpoint of obtaining reinforcing fibers excellent in adhesiveness to rubber, preferably 2 or more, more preferably 3 or more, even more preferably 4 or more per molecule on average. Also the number of the hydrogen-bonding functional groups is, from the viewpoint of controlling the viscosity of the modified conjugated diene rubber to fall within an appropriate range to improve handleability, preferably 80 or less per molecule on average, more preferably 40 or less, even more preferably 30 or less, further more preferably 20 or less, further more preferably 10 or less.

The average number of the hydrogen-bonding functional groups per molecule of the modified conjugated diene rubber is calculated from the equivalent (g/eq) of the hydrogen-bonding functional group of the modified conjugated diene rubber and the styrene-equivalent number-average molecular weight Mn thereof, according to the following expression. The equivalent of the hydrogen-bonding functional group of the modified conjugated diene rubber means a mass of the conjugated diene bonding to one hydrogen-bonding functional group and any other optional monomer than the conjugated diene.

> Average number of hydrogen-bonding functional groups per molecule=[(number-average molecular weight (Mn))/(molecular weight of styrene unit)×(average molecular weight of conjugated diene and any other optional monomer unit than conjugated diene)]/(equivalent of hydrogen-bonding functional group)

The method for calculating the equivalent of the hydrogen-bonding functional group can be appropriately selected depending on the kind of the hydrogen-bonding functional group.

Examples of the method for producing the modified conjugated diene rubber include a method of adding a modifying compound to a polymerization product of a conjugated diene monomer (hereinafter also referred to as "production method (1)"), a method of oxidizing a conjugated diene polymer (hereinafter also referred to as "production method (2)"), and a method of copolymerizing a conjugated diene monomer and a hydrogen-bonding functional group-having radical polymerizable compound (hereinafter also referred to as "production method (3)"), and a method of adding a modifying compound capable of reacting with the polymerization-active end of a polymerization product of a polymerization-active end-having unmodified conjugated diene monomer before adding a polymerization terminator to the polymerization product (hereinafter also referred to as "production method (4)").

[Production Method (i) for Modified Conjugated Diene Rubber]

The production method (1) is a method of adding a modifying compound to a polymerization product of a conjugated dime monomer, that is, an unmodified conjugated diene rubber (hereinafter also referred to as "unmodified conjugated diene rubber").

The unmodified conjugated diene rubber can be prepared by polymerizing a conjugated diene optionally along with any other monomer than the conjugated diene, for example, according to an emulsion polymerization method or a solution polymerization method.

A known method or a method equivalent to a known method is applicable to the solution polymerization method. For example, using a Ziegler catalyst, a metallocene catalyst, or an anion polymerizable active metal or active metal compound in a solvent, and optionally in the presence of a polar compound, a predetermined amount of a conjugated diene-containing monomer is polymerized.

Examples of the solvent include aliphatic hydrocarbons such as n-butane, n-pentane, isopentane, n-hexane, n-heptane, and isooctane; alicyclic hydrocarbons such as cyclopentane, cyclohexane, and methylcyclopentane; and aromatic hydrocarbons such as benzene, toluene, and xylene.

Examples of the anion polymerizable active metal include alkali metals such as lithium, sodium, and potassium; alkaline earth metals such as beryllium, magnesium, calcium, strontium, and barium; and lanthanoid rare earth metals such as lanthanum, and neodymium. Among these anion polymerizable active metals, alkali metals and alkaline earth metals are preferred, and alkali metals are more preferred.

The anion polymerizable active metal compound is preferably an organic alkali metal compound. Examples of the organic alkali metal compound include organic monolithiu compounds such as methyl lithium, ethyl lithium, n-butyl lithium, sec-butyl lithium, t-butyl lithium, hexyl lithium, phenyl lithium, and stilbene lithium; polyfunctional organic lithium compounds such as dilithiomethane, dilithionaphthalene, 1,4-dilithiobutane, 1,4-dilithio-2-ethylcyclohexane, and 1,3,5-trilithiobenzene; and sodium naphthalene, and potassium naphthalane. Among these organic alkali metal compounds, organic lithium compounds are preferred, and organic monolithium compounds are more preferred.

The amount of the organic alkali metal compound to be used may be appropriately set depending on the melt viscosity and the molecular weight of the intended, unmodified conjugated diene rubber and modified conjugated diene rubber, and is generally 0.01 to 3 parts by mass relative to 100 parts by mass of monomers including the conjugated diene.

The organic alkali metal compound can be used as an organic alkali metal amide formed through reaction with a secondary amine such as dibutylamine, dihexylamine or dibenzylamine.

A polar compound is used in anion polymerization generally for controlling the microstructure of the conjugated diene moiety without deactivating the reaction. Examples of the polar compound include ether compounds such as dibutyl ether, tetrahydrofuran, ethylene glycol diethyl ether, and 2,2-di(2-tetrahydrofuryl)propane; tertiary amines such as tetramethylethylenediamine, and trimethylamine; and alkali metal alkoxides and phosphine compounds. The polar compound can be used generally in an amount of 0.01 to 1000 mols relative to the organic alkali metal compound.

The temperature of solution polymerization is generally within a range of −80 to 150° C., preferably within a range of 0 to 100° C., more preferably within a range of 10 to 90° C. The polymerization mode may be any of a batch mode or a continuous mode.

The polymerization reaction can be terminated by addition of a polymerization terminator. Examples of the polymerization terminator include alcohols such as methanol and isopropanol. The resultant polymerization reaction liquid is poured into a poor solvent such as methanol to precipitate the polymerization product, or the polymerization reaction liquid is washed with water, then separated and dried to isolate an unmodified conjugated diene rubber.

As the production method for an unmodified conjugated diene rubber, a solution polymerization method is preferred among the above-mentioned methods.

A known method or a method equivalent to a known method is applicable to the emulsion polymerization method. For example, a predetermined amount of a conjugated diene-containing monomer is emulsified and dispersed in the presence of an emulsifier and then polymerized in emulsion with a radical polymerization initiator.

Examples of the emulsifier include a long-chain fatty acid salt having 10 or more carbon atoms, and a rosin acid salt. Examples of the long-chain fatty acid salt include potassium salts or sodium salts of a fatty acid such as capric acid, lauric acid, myristic acid, palmitic acid, oleic acid, and stearic acid.

As a dispersion solvent, in general, water is used, and may contain a water-soluble organic solvent such as methanol or ethanol within a range not interfering with the stability during polymerization.

Examples of the radical polymerization initiator include persulfates such as ammonium persulfate and potassium persulfate, and organic peroxides and hydrogen peroxide.

For controlling the molecular weight of the resultant unmodified conjugated diene rubber, a chain transfer may be used. Examples of the chain transfer include mercaptans such as t-dodecylmercaptan, and n-dodecyimercaptan; and carbon tetrachloride, thioglycolic acid, diterpene, terpinolene, γ-terpinene, and α-methylstyrene dimer.

The temperature of emulsion polymerization can be appropriately set depending on the kind of the radical polymerization initiator to be used, but is generally within a range of 0 to 100° C., preferably within a range of 0 to 60° C., The polymerization mode may be any of continuous polymerization or batch polymerization.

The polymerization reaction can be terminated by adding a polymerization terminator. Examples of the polymerization terminator include amine compounds such as isopropylhydroxylamine, diethylhydroxylamine, and hydroxylamine; quinone compounds such as hydroquinone and benzoquinone, and sodium nitrite.

After termination of polymerization reaction, if desired, an antiaging agent may be added. After termination of polymerization reaction, if desired, the unreacted monomer is removed from the resultant latex, and then a salt such as sodium chloride, calcium chloride or potassium chloride is added as a coagulant, and optionally while an acid such as nitric acid or sulfuric acid is added to control the pH of the coagulation system to be a predetermined value, the polymerization product is coagulated and then the dispersion solvent is separated to collect the polymerization product. Next, this is washed with water and dewatered, and then dried to give an unmodified conjugated diene rubber. In coagulation, if desired, the latex may be previously mixed with an extension oil in the form of an emulsion dispersion liquid to collect the resultant, extended unmodified conjugated diene rubber.

(Modifying Compound for Use in Production Method (1))

The modifying compound for use in the production method (1) is not specifically limited, but is, from the viewpoint of improving the adhesiveness of the reinforcing fibers, preferably one having a hydrogen-bonding functional group. The hydrogen-bonding functional group may be the same as mentioned above. Among them, from the viewpoint of the intensity of the hydrogen-bonding force thereof, an amino group, an imidazole group, an urea group, a hydroxy group, a mercapto group, a silanol group, an aldehyde group, a carboxy group and derivatives thereof are preferred. The derivatives of a carboxy group are preferably salts thereof, esterified form thereof, amidated forms thereof or acid anhydrides thereof. One alone or two or more kinds of these hydrogen-bonding functional group-having modifying compounds can be used either singly or as combined.

Examples of the modifying compound include unsaturated carboxylic acids such as maleic acid, fumaric acid, citraconic acid, and itaconic acid; unsaturated carboxylic acid anhydrides such as maleic anhydride, citraconic anhydride, 2,3-dimethylmaleic anhydride, and itaconic anhydride; unsaturated carboxylates such as maleates, fumarates, citraconates, and itaconates; unsaturated carboxylic acid amides such as maleic acid amide, fumaric acid amide, citraconic acid amide, and itaconic acid amide; unsaturated carboxylic acid imides such as maleic acid imide, fumaric acid imide, citraconic acid imide, and itaconic acid imide; and silane compounds such as vinyltrimethoxysilane, γ-methacryloxypropyltrimethoxysilane, mercaptomethylmethyldiethoxysilane, mercaptomethyltriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane, and 3-mercaptopropylethoxydimethylsilane.

The amount of the modifying compound to be used is preferably 0.1 to 100 parts by mass relative to 100 parts by mass of the unmodified conjugated diene rubber, more preferably 0.5 to 50 parts by mass, even more preferably 1 to 30 parts by mass.

The reaction temperature is generally preferably within a range of 0 to 200° C., more preferably within a range of 50 to 200° C.

After the modifying compound is grafted to the unmodified conjugated diene rubber to introduce a hydrogen-bonding functional group thereinto, a further modifying compound capable of reacting with the functional group may be added to introduce another hydrogen-bonding functional group into the polymer. Specifically, one example is a method where a maleic anhydride is grafted to an unmodified conjugated diene rubber prepared through living anion polymerization, and thereafter the resultant polymer is further reacted with a compound having a hydroxy group, such as 2-hydroxyethyl methacrylate or methanol, or a compound such as water.

The amount of the modifying compound added to the modified conjugated diene rubber is preferably 0.5 to 40 parts by mass relative to 100 parts by mass of the unmodified conjugated diene rubber, more preferably 1 to 30 parts by mass, even more preferably 1.5 to 20 parts by mass. The amount of the modifying compound added to the modified conjugated diene rubber can be calculated based on the acid value of the modifying compound, or can also be determined using various analyzers, such as infrared spectrometry or nuclear magnetic resonance spectrometry.

The method of adding the modifying compound to an unmodified conjugated diene rubber is not specifically limited. One example employable here is a method of adding one or more modifying compounds selected from an unsaturated carboxylic acid, an unsaturated carboxylic acid derivative and a silane compound, and optionally a radical generator are added to a liquid unmodified conjugated diene rubber, and heating them in the presence or absence of an organic solvent. The radical generator to be used is not specifically limited, and any ordinary commercially-available organic peroxides, azo compounds and hydrogen peroxide are usable.

The organic solvent for use in the method generally includes hydrocarbon solvents and halogenohydrocarbon solvents. Among these organic solvents, hydrocarbon solvents such as n-butane, n-hexane, n-heptane, cyclohexane, benzene, toluene and xylene are preferred.

Further, in reaction of adding a modifying compound according to the above-mentioned method, an antiaging agent may be added from the viewpoint of preventing side reactions. Any ordinary commercially-available antiaging agent is usable, and examples thereof include butylated hydroxytoluene (BHT), and N-phenyl-N'-(1,3-dimethylbutyl)-p-phenylenediamine (Nocrac 6C).

The amount of the antiaging agent to be added is preferably 0.01. to 10 parts by mass relative to 100 parts by mass of the unmodified conjugated diene rubber, more preferably 0.05 to 5 parts by mass. When the amount of the antiaging agent added falls within the above range, side reactions can be prevented and a modified conjugated diene rubber can be obtained at a high yield.

[Production Method (2) for Modified Conjugated Diene Rubber]

The production method (2) includes a method of oxidizing a conjugated diene rubber of a raw material to give an oxidized conjugated diene rubber having an oxygen-containing functional group or bond formed through oxidation reaction in the molecule. Specifically, the functional group and the bond include a hydroxy group, an aldehyde group, a carbonyl group, a carboxy group, and an ether bond.

The method of oxidizing the raw material of a conjugated diene rubber includes a method of heat-treating at a temperature not lower than the oxidation temperature (hereinafter also referred to as "production method (2-1)"), and a method of activating the raw material of a conjugated diene rubber through irradiation with a light having an absorption wavelength thereof followed by reacting it with oxygen (hereinafter also referred to as "production method. (2-2)"). Above all, the method of heat-treating the raw material of a conjugated diene rubber at a temperature not lower than the oxidation temperature thereof (production method (2-1)) is preferred.

The step of oxidation of the conjugated diene rubber is not specifically limited, and oxidation may be carried out before a conjugated diene rubber is mixed with an oil, or after a conjugated diene rubber has been mixed with an oil, or after a conjugated diene rubber as mixed with an oil has been adhered to fibers.

[Production Method (2-1) for Oxidized Conjugated Diene Rubber]

The production method (2-1) is a method of heat-treating a raw material of a conjugated diene rubber at a temperature not lower than the oxidation temperature thereof, The heat treatment is carried out in an oxygen-containing atmosphere, preferably in an air.

Not specifically limited, the heat-treatment temperature may be any temperature at which the raw material of a conjugated diene rubber is oxidized, but is, from the viewpoint of increasing the reaction speed for oxidation and enhancing productivity preferably 150° C. or higher, more preferably 170° C. or higher, even more preferably 190° C. or higher. As will be described below, in the case where oxidation of a raw material of a conjugated diene rubber is carried out on the surfaces of hydrophilic fibers, the temperature is, from the viewpoint of preventing the fibers from being deteriorated, preferably 240° C. or lower, more preferably 220° C. or lower.

Not specifically limited, the heat-treatment time may fall within a range where the raw material of a conjugated diene rubber is not deteriorated, but is preferably 30 minutes or shorter, more preferably 20 minutes or shorter.

By adding a thermal radical generator to the raw material of a conjugated diene rubber, the temperature necessary for oxidation can be lowered.

Examples of the thermal radical generator include peroxides, azo compounds, and redox initiators. Above all, peroxides are preferred from the viewpoint that the thermal radical generator bonds to a conjugated diene rubber to add an oxygen-containing structure to the conjugated diene rubber.

Examples of the peroxides include t-butyl hydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, and ammonium persulfate.

Examples of the azo compounds include azobisisobutyronitrile (AIBN), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutylamidine) dichloride, 2,2'-azobis(N,N'-dimethyleneisobutylamidine), 2,2'-azobis(2-methyl-N-[1,1-bis(hydroxymethyl)-2-hydroxyethyl]propionamide), and 2,2'-azobis(isobutylamide) dihydrate. One alone or two or more kinds of the thermal radical generators may be used either singly or as combined.

As the thermal radical generator, a redox generator may also be used. Examples of the redox generator include a combination of a persulfate, acid sodium sulfite and ferrous sulfate, a combination of t-butyl hydroperoxide, acid sodium sulfite and ferrous sulfate, and a combination of p-menthane hydroperoxide, ferrous sulfate, sodium ethylenediaminetetraacetate and sodium formaldehyde sulfoxylate.

[Production Method (2-2) for Oxidized Conjugated Diene Rubber]

The production method (2-2) is a method of activating a raw material of a conjugated diene rubber by irradiation with a light having an absorption wavelength thereof, and reacting it with oxygen.

The production method (2-2) is carried out in an oxygen-containing atmosphere, preferably in an air. The wavelength of the light to be used is not specifically limited, as long as the light is one that the raw material of a conjugated diene rubber absorbs to induce radical reaction, but is preferably a UV light that the raw material of a conjugated diene rubber strongly absorbs.

By adding a photoradical generator to the raw material of a conjugated diene rubber, the irradiation dose of light necessary for oxidation can be lowered.

Examples of the photoradical generator include acetophenone, acetophenone benzyl keta, 1-hydroxycyclohexyl phenyl ketone, 2,2-dimethoxy-1,2-diphenylethan-1-one, xanthone, fluorenone, benzaldehyde, fluorine, anthraquinone, triphenylanfine, carbazole, 3-methylacetophenone, 4,4'-dimethoxybenzophenone, benzoin propyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy)phenyl(2-hydroxy-2-propyl) ketone, 2,4,6-trimethylbenzoyl diphenylphosphine oxide, and bis(2,6-dimethoxybenzoyl)-2,4,4-trimethylpentyl phosphine oxide. One alone or two or more kinds of the photoradical generators may be used either singly or as combined.

[Production Method (3) for Modified Conjugated Diene Rubber]

The production method (3) includes a method of random-copolymerizing, block-copolymerizing or graft-copolymerizing a conjugated diene monomer and a hydrogen-bonding functional group-having radical polymerizable compound according to a known method.

(Radical Polymerizable Compound Having Hydrogen-Bonding Functional Group for Use in Production Method (3))

The hydrogen-bonding functional group-having radical polymerizable compound for use in the production method (3) is not specifically limited so far as it is a compound having both a hydrogen-bonding functional group and a reactive multiple bond in the molecule. Specifically, the compound includes an aldehyde having a reactive multiple bond, and an acetalized form of the aldehyde; a monocarboxylic acid having a reactive multiple bond, a salt of the monocarboxylic acid, an esterified form of the monocarboxylic acid, and an acid anhydride of the monocarboxylic acid; a dicarboxylic acid having a reactive multiple bond, a salt of the dicarboxylic acid, an esterified form of the dicarboxylic acid, and an acid anhydride of the dicarboxylic acid; and an amine compound having a reactive multiple bond.

Among the multiple bond-having aldehydes, examples of aldehydes having a reactive carbon-carbon double bond include unsaturated aldehydes, such as alkenals having 3 to 30 carbon atoms, preferably alkenals having 3 to 25 carbon atoms, such as acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 10-undecenal, 2-ethylcrotonaldehyde, 3-(dimethylamino)acrolein, myristoleinaldehyde, palmitaeinaldehyde, oleinaldehyde, elaidinaldehyde, baxenaldehyde, gadoleinaldehyde, erucaldehyde, nerbonaldehyde, linolaldehyde, citronellol, cinnamaldehyde, and vanillin; alkadienals having 5 to 30 carbon atoms, preferably alkadienals having 5 to 25 carbon atoms, such as 2,4-pentadienal, 2,4-hexadienal, 2,6-nonadienal, and citral; alkatrienals having 7 to 30 carbon atoms, preferably alkatrienais having 7 to 25 carbon atoms, such as linolenaldehyde, and ereostearinaldehyde; alkatetraenais having 9 to 30 carbon atoms, preferably alkatetraenais having 9 to 25 carbon atoms, such as stearidonaldehyde, and arachidonaldehyde; and alkapentaenals having 11 to 30 carbon atoms, preferably alkapentaenals having 11 to 25 carbon atoms, such as eicosapentaenaldehyde. Among the aldehydes, those having cis-trans isomers include both cis-forms and trans-forms. One alone or two or more kinds of these aldehydes may be used either singly or as combined.

Among the acetalized forms of multiple bond-having aldehydes, acetalized forms of reactive carbon-carbon double bond-having aldehydes include acetalized forms of the above-mentioned aldehydes, concretely, 3-(1,3-dioxalan-2-yl)-3-methyl-1-propene that is an acetalized form of 2-methyl-3-butenal, and 3-(1,3-dioxalan-2-yl)-2-methyl-1-propene that is an acetalized form of 3-methyl-3-butenal.

Among the multiple bond-having aldehydes and the acetalized forms of the aldehydes, reactive carbon-carbon triple bond-having aldehydes and acetalized forms thereof include carbon-carbon triple bond-having aldehydes such as propioladehyde, 2-butyn-1-al and 2-pentyn-1-al, and acetalized forms of the aldehydes, and the like.

Among the multiple bond-having aldehydes and the acetalized forms of the aldehydes, reactive carbon-carbon double bond-having aldehydes are preferred, and for example, one or more selected from acrolein, methacrolein, crotonaldehyde, 3-butenal, 2-methyl-2-butenal, 2-methyl-3-butenal, 2,2-dimethyl-3-butenal, 3-methyl-2-butenal, 3-methyl-3-butenal, 2-pentenal, 2-methyl-2-pentenal, 3-pentenal, 3-methyl-4-pentenal, 4-pentenal, 4-methyl-4-pentenal, 2-hexenal, 3-hexenal, 4-hexenal, 5-hexenal, 7-octenal, 2-ethylcrotonaldehyde, 3-(dimethylamino)acrolein, and 2,4-pentadienal are preferred. Above all, as having good reactivity in copolymerization, one or more selected from acrolein, methacrolein, crotonalehyde, and 3-butenal are more preferred.

Examples of the multiple bond-having monocarboxylic acids, salts of the monocarboxylic acids, esterified forms of the monocarboxylic acids, and acid anhydrides of the monocarboxylic acids include reactive carbon-carbon double bond-having carboxylic acids, salts of the carboxylic acids, esterified forms of the carboxylic acids, and acid anhydrides of the carboxylic acids, such as (meth)acrylic acid, sodium (meth)acrylate, potassium(meth)acrylate, methyl(meth)acrylate, ethyl(meth)acrylate, butyl(meth)acrylate, propyl (meth)acrylate, 2-hydroxyethyl(meth)acrylate, 2-hydroxypropyl(meth)acrylate, 3-hydroxyprop(meth)acrylate, 2-hydroxybutyl(meth)acrylate, 3-hydroxybutyl(meth)acrylate, 4-hydroxybutyl(meth)acrylate, vinyl(meth)acrylate, 2-(trifluoromethyl)acrylic acid, methyl 2-trifluoromethylacrylate, ethyl 2-trifluoromethylacrylate, propyl 2-trifluoromethylacrylate, 2-butyl 2-trifluoromethylacrylate, 2-hydroxyethyl, 2-trilfluoromethylacrylate, vinyl 2-trifluoromethylacrylate, methyl cinnamate, vinyl cinnamate, methyl crotonate, vinyl crotonate, methyl 3-methyl-3-butenoate, vinyl 3-methyl-3-butenoate, methyl 4-pentenoate, vinyl 4-pentenoate, methyl 2-methyl-4-pentenoate, vinyl 2-methyl-4-pentenoate, methyl 5-hexenoate, vinyl 5-hexenoate, methyl 3,3-dimethyl-4-pentenoate, vinyl 3,3-dimethyl-4-pentenoate, methyl 7-octenoate, vinyl 7-octenoate, methyl trans-3-pentenoate, vinyl trans-3-pentenoate, methyl trans-4-decenoate, vinyl trans-4-decenoate, ethyl 3-methyl-3-butenoate, ethyl 4-pentenoate, ethyl 2-methyl-4-pentenoate, ethyl 5-hexenoate, ethyl 3,3-dimethyl-4-pentenoate, ethyl 7-octenoate, ethyl trans-3-pentenoate, ethyl trans-4-decenoate, methyl 10-undecenoate, vinyl 10-undecenoate, (meth)acrylic anhydride, 2-(trifluoromethyl)acrylic anhydride, cinnamic anhydride, crotonic anhydride, 3-methyl-3-butenoic anhydride, 4-pentenoic anhydride, 2-methyl-4-pentenoic anhydride, 5-hexenoic anhydride, 3,3-dimethyl-4-pentenoic anhydride, 7-octenoic anhydride, trans-3-pentenoic anhydride, trans-4-decenoic anhydride, 3-methyl-3-butenoic anhydride, 4-pentenoic anhydride, 2-methyl-4-pentenoic anhydride, and 10-undecenoic anhydride; and reactive carbon-carbon triple bond-having carboxylic acids and esterified forms of the carboxylic acids, such as propiolic acid, methyl propiolate, ethyl propiolate, vinyl propiolate, tetrolic acid, methyl tetrolate, ethyl tetrolate, and vinyl tetrolate.

In the present specification, the above-mentioned "(meth)acrylic acid" collectively means "acrylic acid" and "methacrylic acid".

Examples of the multiple bond-having dicarboxylic acids, salts of the dicarboxylic acids, esterified forms of the dicarboxylic acids, and acid anhydrides of the dicarboxylic acids include reactive carbon-carbon double bond-having dicarboxylic acids, salts of the dicarboxylic acids, esterified forms of the dicarboxylic acids, and acid anhydrides of the dicarboxylic acids, such as maleic acid, sodium malate, potassium maleate, methyl maleate, dimethyl maleate, maleic anhydride, itaconic acid, methyl itaconate, dimethyl itaconate, itaconic anhydride, himic acid, methyl himate, dimethyl bimate, and himic anhydride.

Among the above-mentioned multiple bond-having monocarboxylic acids, salts of the monocarboxylic acids, esterified forms of the monocarboxylic acids, the monocarboxylic acid anhydrides, the above-mentioned multiple bond-having dicarboxylic acids, salts of the dicarboxylic acids, esterified forms of the carboxylic acids, and the dicarboxylic acid anhydrides, reactive carbon-carbon double bond-having compounds are preferred, and above all, as having good reactivity in copolymerization, one or more selected from methyl(meth)acrylate, ethyl(meth)acrylate, butyl(meth)acrylate, vinyl(meth acrylate, (meth)acrylic anhydride, 2-(trifluoromethyl)acrylic anhydride, cinnamic anhydride, crotonic anhydride, methyl maleate, dimethyl maleate, maleic anhydride, methyl itaconates, dimethyl itaconates and itaconic anhydride are more preferred.

Among the above-mentioned multiple bond-having amine compounds, examples of the reactive carbon-carbon double bond-having amine compounds include allylamine, 3-butenylamine, 4-pentenylamine, 5-hexenylamine, 6-heptenylamine, 7-octenylamine, oleylamine, 2-methlallyline, 4-aminostyrene, 4-vinylbenzylamine, 2-allylglycine, S-allylcysteine, α-allyaniline, 2-allylaniline, geranylamine, vigabatrin, 4-vinylaniline, and 4-vinyloxyaniline. Among these, as having good reactivity in copolymerization, one or more selected from allylamine, 3-butenylamine and 4-pentenylamine are preferred.

[Production Method (4) for Modified Conjugated Diene Rubber]

The production method (4) is a method of adding a modifying compound capable of reacting with the polymerization-active end of a polymerization product of a polymerization-active end-having unmodified conjugated dime monomer (unmodified conjugated diene rubber) before a polymerization terminator is added to the polymerization product. The polymerization-active end-having unmodified conjugated diene rubber can be prepared by polymerizing a conjugated diene monomer optionally along with any other monomer than the conjugated diene, for example, according to an emulsion polymerization method or a solution polymerization method, in the same manner as in the above-mentioned production method (1).

Examples of the modifying compound usable in the production method (4) include modifying agents such as dimethyldiethoxysilane, tetramethoxysilane, tetraethoxysilane, 3-aminopropyltriethoxysilane, tetraglycidyl-1,3-bisaminomethylcydohexane, 2,4-tolylene diisocyanate, carbon dioxide, ethylene oxide, succinic anhydride, 4,4'-bis (diethylamino)benzophenone, N-vinylpyrrolidone, N-methylpyrrolidone, 4-dimethylaminobenzylidene-aniline, and dimethylimidazolidinone, and other modifying agents described in JP 2011-132298 A.

The amount of the modifying compound to be used in the production method (4) is, in the case where an organic alkali metal compound is used for polymerization, preferably within a range of 0.01 to 100 molar equivalents relative to the organic alkali metal compound. The reaction temperature is generally within a range of −80 to 150° C., preferably 0 to 100° C., more preferably 10 to 90° C.

After the modifying compound has been added to introduce a hydrogen-bonding functional group into an unmodified conjugated diene rubber before addition of a polymerization initiator, a modifying compound capable of reacting with the functional group can be added to further introduce another hydrogen-bonding functional group into the polymer.

The unmodified conjugated diene rubber may contain a unit derived from any other monomer than the above-mentioned conjugated diene monomer and the hydrogen-bonding functional group-having radical polymerizable compound within a range not interfering with adhesiveness. The other monomer includes a copolymerizable ethylenic unsaturated monomer and an aromatic vinyl compound, and specific compounds and the content thereof are the same as above.

The production method for the modified conjugated diene rubber is not specifically limited, but from the viewpoint of productivity, the production method (1) or (2) or (3) is preferred, the production method (1) or (3) is more preferred, and the production method (1) is even more preferred.

(Physical Properties of Conjugated Diene Rubber)

The weight-average molecular weight (Mw) of the conjugated diene rubber is not specifically limited, but is, from the viewpoint of improving adhesiveness, preferably 2,000 or more, more preferably 5,000 or more, even more preferably 10,000 or more, further more preferably 15,000 or more, further more preferably 20,000 or more, particularly preferably 25,000 or more, and is, from the viewpoint of handleability, preferably 150,000 or less, more preferably 120,000 or less, even more preferably 100,000 or less, further more preferably 75,000 or less, still further more preferably 50,000 or less.

The number-average molecular weight (Mn) of the conjugated diene rubber is not specifically limited, but is, from the viewpoint of improving adhesiveness, preferably 2,000 or more, more preferably 5,000 or more, even more preferably 10,000 or more, further more preferably 15,000 or more, further more preferably 20,000 or more, particularly more preferably 25,000 or more, and is, from the viewpoint of handleability; preferably 120,000 or less, more preferably 75,000 or less, even more preferably 50,000 or less, further more preferably 45,000 or less.

Mw and Mn of the conjugated diene rubber each are a polystyrene-equivalent weight-average molecular weight or number-average molecular weight, respectively, derived from measurement through gel permeation chromatography (GPC).

The molecular weight distribution (Mw/Mn) of the conjugated dine rubber is preferably 1.0 to 5.0, more preferably 1.0 to 3.0, even more preferably 1.0 to 2.0, further more preferably 1.0 to 1.5, especially more preferably 1.0 to 1.3. When Mw/Mn falls within the above range, fluctuation of the viscosity of the conjugated diene rubber is small and therefore handleability thereof is good.. The molecular weight distribution (Mw/Mn) means a ratio of standard polystyrene-equivalent weight-average molecular weight (Mw)/number-average molecular weight (Mn) determined through GPC measurement.

From the viewpoint of adhesiveness between the conjugated diene rubber and fibers, the conjugated diene rubber is preferably liquid.

In the present specification, "liquid" means that the melt viscosity measured at 38° C. of the conjugated diene rubber is 4,000 Pa·s or less. The melt viscosity is, from the viewpoint of improving adhesiveness, preferably 0.1 Pa·s or more, more preferably 1 Pa·s or more, even more preferably 10 Pa·s or more, further more preferably 30 Pa·s or more, further more preferably 50 Pa·s or more, and is, from the viewpoint of handleability, preferably 2,000 Pa·s or less, more preferably 1,500 Pa·s or less, even more preferably 1,000 Pa·s or less. When the melt viscosity falls within the above range, the handleability of the conjugated diene rubber can be bettered while the adhesiveness thereof is improved.

The melt viscosity of the conjugated diene rubber is a viscosity measured with a Brookfield viscometer (B-type viscometer) at 38° C.

The glass transition temperature (Tg) of the conjugated diene rubber can vary depending on the vinyl content of the conjugated diene unit, the kind of the conjugated dime, and the content of the unit derived from any other monomer than the conjugated diene, but is preferably −100 to 10° C., more preferably −100 to −10° C., even more preferably −100 to −20° C. When Tg falls within the above range, viscosity increase can be prevented to better handleability.

<Oil>

In the present invention, an oil having a vapor pressure at 20° C. of 10 Pa or less is used. When the vapor pressure at 20° C. of the oil is 10 Pa or less, the oil does not evaporates for a long period of time even after the adhesive component has been applied to the surfaces of fibers, and therefore the wear resistance of the reinforcing fibers improves. In addition, owing to the reason that the coating unevenness of the adhesive component hardly occurs, the adhesiveness of the adhesive component can also be improved, and the production facilities can be prevented from being contaminated during production. From these viewpoints, the vapor pressure at 20° C. of the oil is preferably 5 Pa or less, more preferably 1 Pa or less, even more preferably 0.1 Pa or less, further more preferably 0.01 Pa or less. In the present invention, preferably, a so-called nonvolatile oil having a vapor pressure at 20° C. of 10 Pa or less is used.

In the present invention, the vapor pressure at 20° C. of the oil means a value calculated according to an optimum curve drawn by applying an Antoine formula to a value measured by a gas flow method.

Not specifically limited, the oil having a vapor pressure at 20° C. of 10 Pa or less that is usable in the present invention may be any one miscible with a conjugated diene rubber, and examples thereof includes a natural oil and a synthetic oil. Examples of the natural oil include a mineral oil and a vegetable oil.

As the mineral oil, usable here are a paraffin-based mineral oil, an aromatic mineral oil and a naphthene-based mineral oil produced through the general purification method such as solvent refining and hydrogenation purification, as well as a wax produced in Fischer-Tropsch synthesis (gas-to-liquid wax), and a mineral oil produced by isomerizing the wax.

Commercial product of paraffin-based mineral oil include "Diana Process Oil" series by Idemitsu Kosan Co., Ltd., and "Super Oil" series by JX Energy Corporation, and the like.

Examples of vegetable oil include linseed oil, camellia oil, macadamia nut oil, corn oil, mink oil, olive oil, avocado oil, sasanqua oil, castor oil, safflower oil, jojoba oil, sunflower oil, almond oil, rapeseed oil, sesame oil, soybean oil, peanut oil, cotton seed oil, coconut oil, palm kernel oil, and rice bran oil.

Synthetic oil includes a hydrocarbon synthetic oil, an ester synthetic oil, and an ether synthetic oil, and the like. The hydrocarbon synthetic oil includes an α-olefin oligomer or a hydride thereof, such as polybutene, polyisobutylene, 1-octene oligomer, 1-decease oligomer, and ethylene-propylene copolymer, as well as an alkylbenzene, and an alkylnaphthalene, and the like. The ester synthetic oil includes a triglycerin fatty acid ester, a diglycerin fatty acid ester, a monoglycerin fatty acid ester, a monoalcohol fatty acid ester, and a polyalcohol fatty acid ester, and the like. The ether synthetic oil includes a polyoxyalkylene glycol, and a polyphenyl ether, and the like. Commercial products of synthetic oil include "Linealene" series by Idemitsu Kosan Co., Ltd., and "FGC32", "FGC46" and "FGC68" by Anderol, Inc., and the like The oil may be one kind selected form the above-mentioned natural oil and synthetic oil, or may be a mixture of two or more kinds of natural oils, a mixture of two or more kinds of synthetic oil, or a mixture of one or more kinds of natural oil and one or more kinds of synthetic oil.

In the present invention, from the viewpoint of controlling the viscosity of the adhesive component to fall within a suitable range to improve processability, a mineral oil is preferred, and at least one kind selected from a paraffin-based mineral oil and a naphthene-based mineral oil is more preferred.

The flash point of the oil for use in the present invention is, from the viewpoint of safety, preferably 70° C. or higher. From this viewpoint, the flash point of the oil is preferably 100° C. or higher, more preferably 130° C. or higher, even more preferably 140° C. or higher. The upper limit of the flash point of the oil is, though not specifically limited thereto, preferably 320° C. or lower, more preferably 260° C. or lower, even more preferably 200° C. or lower.

<Viscosity at 50° C. of Adhesive Component>

Preferably, the viscosity of the adhesive component measured at 50° C. is 500 Pa·s or less. When the viscosity falls within the range, the adhesive component can be efficiently adhered to fibers, and the adhesive component may hardly adhere to production facilities and can therefore prevent; contamination of the production facilities. From this viewpoint, the viscosity of the adhesive component measured at 50° C. is preferably 250 Pa·s or less, more preferably 100 Pa·s or less, even more preferably 80 Pa·s or less. The viscosity is preferably lower to better handleability and suppress process contamination.

The viscosity at 50° C. of the adhesive component means a viscosity measured at 50° C. using a Brookfield viscometer (B-type viscometer). The rotor and the rotation number in measurement can be appropriately set to approach a full-scale process.

<Composition of Adhesive Component>

The content of the conjugated diene rubber in the adhesive component is, from the viewpoint of improving the adhesion force to rubber, preferably 1% by mass or more, more preferably 5% by mass or more, even more preferably 10% by mass or more, and is preferably 80% by mass or less, more preferably 60% by mass or less, even more preferably 50% by mass or less, further more preferably 40% by mass or less. When the content of the conjugated diene rubber in the adhesive component falls within the range, the viscosity of the adhesive component can be prevented from being impossibly high while the adhesive component can secure a sufficient adhesion force.

The content of the oil in the adhesive component is preferably 20% by mass or more, more preferably 40% by mass or more, even more preferably 50% by mass or more, further more preferably 60% by mass or more, and is preferably 99% by mass or less, more preferably 95% by mass or less, even more preferably 90% by mass or less.

The ratio by mass of the conjugated diene rubber to the oil [conjugated diene rubber (R)/oil (O)] in the adhesive component is preferably 0.1/9.9 to 8/2, more preferably 0.5/9.5 to 6/4, even more preferably 1/9 to 5/5, further more preferably 1/9 to 4/6, it is generally known that oil worsens adhesiveness of rubber, but in the case where a conjugated diene rubber and an oil are used, as mixed in the specific ratio by mass mentioned above, the viscosity thereof can be lowered while the adhesiveness can be maintained as such, and the handleability of the adhesive component improves and the adhering workability thereof to fibers also improves.

One kind alone or two or more kinds of the conjugated diene rubber can be used either singly or as combined. Also one kind alone or two or more kinds of oil can he used either singly or as combined.

Further, the adhesive component in the present invention can contain any other component than a conjugated diene rubber and an oil, within a range not detracting from the adhesion force to rubber.

The other component includes other polymers (e.g., unmodified conjugated diene rubber), acids, alkalis, antioxidants, curing agents, dispersants, pigments, dyes, adhesion promoters, and carbon black, and the like.

In the case where the adhesive component contains the other component, the content thereof is preferably 10,000 parts by mass or less relative to 100 parts by mass of the conjugated diene rubber, more preferably 1,000 parts by mass or less, even more preferably 100 parts by mass or less, further more preferably 50 parts by mass or less, further more preferably 25 parts by mass or less, further more preferably 10 parts by mass or less.

<Fibers>

The fibers for use for the reinforcing fibers of the present invention are not specifically limited, but are, from the viewpoint of the affinity to the above-mentioned adhesive component, preferably hydrophilic fibers. In the present invention, "fibers" include not only short fibers and long fibers, but also other forms of nonwoven fabrics, woven fabrics, knitted fabrics, felts, sponges, and the like.

The hydrophilic synthetic fibers include synthetic fibers formed of a thermoplastic resin having a hydrophilic functional group such as a hydroxy group, a carboxy group, a sulfonic acid group, and an amino group, and/or a hydrophilic bond such as an amide bond.

Specific examples of such thermoplastic resins include polyvinyl alcohol resins, polyamide resins [e.g., aliphatic polyamides such as polyamide 6, polyamide 66, polyamide 11, polyamide 12, polyamide 610, polyamide 612, polyamide 9C (polyamide composed of nonanediamine and cyclohexane- dicarboxylic acid); semi-aromatic polyamides synthesized from an aromatic dicarboxylic acid and an aliphatic diamine such as polyamide 9T (polyamide formed of nonanediamine and terephthalic acid); and wholly-aromatic polyamides synthesized from an aromatic dicarboxylic acid and an aromatic diamine such as polyparaphenylene terephthalamide], and polyacrylamide resins.

Among these, polyvinyl alcohol resins and polyamide resins are preferred. One kind alone or two or more kinds of hydrophilic synthetic fibers may be used either singly or as combined. These hydrophilic synthetic fibers may be further treated for hydrophilization to be mentioned below, for the purpose of more increasing the hydrophilicity thereof.

The hydrophilic natural fibers include natural cellulose fibers of wood pulp or cotton pulp such as kraft pulp, or non-wood pulp such as straw pulp, or the like.

The hydrophilic regenerated fibers include regenerated cellulose fibers of rayon, lyocell, copra, polynosic, or the like.

One alone or two or more kinds of these natural fibers and regenerated fibers can be used either singly or as combined in addition, these hydrophilic natural fibers and regenerated fibers may be further treated for hydrophilization to be mentioned below, for the purpose of more increasing the hydrophilicity thereof.

The hydrophilic fibers may be hydrophilic at least at the surfaces thereof, and for example, they may also be fibers produced by hydrophilizing the surfaces of hydrophobic fibers, or core/sheath composite fibers in which the core part is formed of a hydrophobic resin and the sheath part is formed of a hydrophilic resin. Regarding examples of the hydrophilic resin to constitute the sheath part, reference may be made to the description of the hydrophilic synthetic fibers. Examples of the hydrophobic fibers formed of a hydrophobic resin include polyolefin fibers of polyethylene or polypropylene, polyester fibers of polyethylene terephthalate, and wholly-aromatic polyester fibers. Among these, polyester fibers are preferred.

Hydrophilization treatment is not specifically limited so far as it is a treatment for chemically or physically imparting a hydrophilic functional group to the surfaces of fibers. For example, the treatment includes a method of modifying hydrophobic fibers formed of the above-mentioned hydrophobic resin, with a compound containing a hydrophilic functional group such as an isocyanate group, an epoxy group, a hydroxy group, an amino group, an ether group, an aldehyde group, a carbonyl group, a carboxy group, and an urethane group, or with a derivative thereof, and a method of surface-modifying the hydrophobic fibers through irradiation with electron rays.

The hydrophilic fibers for use in the present invention are, from the viewpoint of using them for reinforcing fibers, preferably synthetic fibers and regenerated fibers, and above all, one or more selected from polyvinyl alcohol fibers formed of a raw material of a polyvinyl alcohol resin, regenerated cellulose fibers, and fibers prepared by hydrophilizing the surfaces of hydrophobic fibers are preferred.

In the present invention, hydrophilic fibers are used, and accordingly, the modified conjugated diene rubber contained in the adhesive component and the hydrophilic fibers can express a strong affinity effect therebetween and, as a result, the adhesive component can firmly bond to the hydrophilic fibers to further enhance the adhesion force thereof to rubber.

As the polyvinyl alcohol fibers, those commercially sold by Kuraray Co., Ltd. as a trade name "KURALON" having a single fiber fineness of 0.1. to 30 dtex or so are preferably used from the viewpoint of favorably using the reinforcing fibers of the present invention for automobile hoses, especially for hydraulic brake hoses for automobiles.

In the present invention, one kind alone or two or more kinds of fibers may be used either singly or as combined.

[Production Method for Reinforcing Fibers]

The production method for the reinforcing fibers of the present invention is not specifically limited so far as i is a method including a step of adhering the above-mentioned conjugated diene rubber in a state mixed with the above-mentioned oil is adhered to fibers. By adhering the above-mentioned conjugated diene rubber, to fibers, in a state mixed with the above-mentioned oil, the conjugated diene rubber can be efficiently adhered to fibers and contamination of production facilities can be suppressed.

As a more specific production method for the reinforcing fibers of the present invention, from the viewpoint of enhancing the adhesion force to rubber, a method (I) of forming an adhesive layer of the above-mentioned adhesive component on the surfaces of fibers is preferred.

[Method (I)]

The method (I) is not specifically limited so far as it is a method of forming an adhesive layer of the adhesive component on the surfaces of fibers, but from the viewpoint of improving adhesiveness to rubber, the method preferably includes the following step I-1.

Step I-1: A Step of Adhering the Adhesive Component to the Surfaces of Fibers.

In the step I-1, the method of adhering the adhesive component to fibers is not specifically limited. Examples of the method include a method of adhering the adhesive component directly as it is, and a method of adhering the adhesive component optionally after adding a solvent thereto.

The method of adhering the adhesive component is preferably carried out according to one or more selected from dipping, roll coating, oiling roll coating, oiling guide coating, nozzle (spray) coating or brush coating.

The amount of the adhesive component to be adhered is, from the viewpoint of improving the adhesiveness between reinforcing fibers and rubber, preferably 0.01 parts by mass or more relative to 100 parts by mass of fibers, more preferably 0.1 parts by mass or more, even more preferably 1 part, by mass or more, and is, from the viewpoint of the balance between production cost and performance, preferably 10 parts by mass or less, more preferably 5 parts by mass or less, even more preferably 3 parts by mass or less.

In the present invention, a conjugated diene rubber and a specific oil are used as combined, and therefore after the adhesive component has been adhered to fibers, reinforcing fibers of the present invention can be obtained by aging them at room temperature of 20° C. or so for 3 to 10 days or so, but as the case may be, the following step I-2 may be carried out.

Step I-2: A Step of Heat-Treating the Adhesive Component-Adhered Fibers Prepared in the Step I-1.

The heat treatment in the step I-2 is preferably carried out at a treatment; temperature of 100 to 200° C. for a treatment time of 0.1. seconds to 2 minutes, The conjugated diene rubber contained in the adhesive component has a reactive multiple bond, and therefore the heat treatment in the presence of oxygen is preferably at 200° C. or lower, more preferably 175° C. or lower. When the heat treatment temperature falls within the range, adhesion force can he increased without; reducing the reactive multiple bond amount in the conjugated diene rubber, and further, degradation of fibers can be prevented to improve quality such as coloring.

The reinforcing fibers may contain any other component than the hydrophilic fibers and the adhesive component. The other component includes a crosslinking agent, an acid, a base, an inorganic salt, an organic salt, a pigment, a dye, an antioxidant, a polymerization initiator, a plasticizer, and the like.

The total content of the hydrophilic fibers and the adhesive component in the reinforcing fibers is, from the viewpoint of enhancing the adhesion force to rubber and the reinforcing strength thereof, preferably 80% by mass or more, more preferably 90% by mass or more, even more preferably 95% by mass or more.

<Physica Properties of Reinforcing Fibers>

Preferably, the reinforcing fibers are multifilaments having a single fiber fineness of 0.1 dtex or more and 30 dtex or less. The single fiber fineness may be less than 0.1 dtex, but such multifilaments are difficult to produce industrially, and therefore the single fiber fineness is preferably 0.1 dtex or more. On the other hand, when the single fiber fineness is 30 dtex or less, the surface area of the fibers formed to be reinforcing fibers can be large to be able to enhance adhesiveness to rubber. From these viewpoints, the reinforcing fibers of the present invention are preferably multifilaments having a single fiber fineness of more preferably 0.3 dtex or more, even more preferably 0.5 dtex or more, further more preferably 1 dtex or more, and having a single fiber fineness of more preferably 20 dtex or less, even more preferably 1.5 dtex or less, further more preferably 10 dtex or less.

The adhesion force to rubber of the reinforcing fibers of the present invention is preferably 15 N/25.4 mm or more, more preferably 20 N/25.4 mm or more, even more preferably 25 N/25.4 mm or more, further more preferably 30 N/25.4 mm or more, and is generally 200 N/25.4 mm or less. When the adhesion force to rubber of the reinforcing fibers is not lower than the above-mentioned lower limit, woven fabrics, knitted fabrics and molded articles excellent in reinforcing strength can be obtained.

The adhesion force to rubber of the reinforcing fibers can be measured according to the method described in the section of Examples.

Preferably, the reinforcing fibers of the present invention has an initial tensile resistance, as measured according to JIS L 1013:2010, of 60 cN/dtex or more. When the initial tensile resistance of the reinforcing fibers is 60 cN/dtex or more, the reinforcing strength in bonding the reinforcing fibers to rubber enhances. From this viewpoint, the initial tensile resistance is more preferably 100 cN/dtex or more, even more preferably 130 cN/dtex or more, further more preferably 160 cN/dtex or more, and especially more preferably 200 cN/dtex or more. The upper limit of the initial tensile resistance is not specifically limited, but is generally 1,000 cN/dtex or less.

The reinforcing fibers can be used in any arbitrary form and are preferably used in the form of fiber cords, woven fabrics or knitted fabrics that contain the reinforcing fibers at least partly therein, and more preferably in the form of woven fabrics or knitted fabrics that contains the reinforcing fibers at least partly therein. For example, the reinforcing fibers can be used as a knitted fabric in which they adhere to rubber as described hereinunder. In addition, they can also be used as reinforcing fibers to be buried in resin or cement.

[Molded Article]

The molded article of the present invention is not specifically limited so far as it uses the above-mentioned reinforcing fibers. Among them, the reinforcing fibers has excellent adhesiveness to rubber, so they are especially preferably used in a molded article using the reinforcing fibers and a rubber component (hereinafter also referred to as "rubber molded article"). The reinforcing fibers for use in the rubber molded article are, from the viewpoint of rubber form retention, preferably in the form of a woven fabric or a knitted fabric containing the reinforcing fibers at least partly therein, more preferably in the form of a laminate produced by laminating a reinforcing layer of a woven fabric or a knitted fabric that contains the reinforcing fibers at least partly therein, and a rubber layer.

The rubber molded article can be used as tires such as automobile tires, belts such as conveyor belts or timing belts, hoses, and rubber product members such as vibration absorbing rubbers, and is, above all, more preferably used as tires, belts or hoses.

Regarding the automobile tires, for example, the rubber molded article can be used for various members of composite materials formed of reinforcing fibers and a rubber component such as belts, carcass plies, breakers, and bead tapes.

The hoses can be used for the purpose of transporting various fluids in various uses, and are, for example, favorable for fluid transport hoses for automobiles, and are especially favorably used for liquid fuel hoses for automobiles, hydraulic brake hoses for automobiles and refrigerant hoses, more favorably for hydraulic brake hoses for automobiles.

Preferably, the rubber molded article is molded using a rubber composition prepared by blending the above-mentioned reinforcing fibers and a rubber component blended with a blending agent generally used in the rubber industry.

Examples of the rubber component include, though not specifically limited thereto, NR (natural rubber), IR (polyisoprene rubber), BR (polybutadiene rubber), SBR (styrene-butadiene rubber), NPR (nitrite rubber), EPM (ethylene-propylene copolymer rubber), EPDM (ethylene-propylene-non-conjugated diene copolymer rubber), IIR (butyl rubber), halogenobutyl rubber, and CR (chloroprene rubber). Among these, NR, IR, BR, SBR, EPDM, and CR are preferably used, and EPDM is more preferably used. One alone or two or more kinds of these rubber components may be used either singly or as combined. For use for tires, those generally used in the tire industry are used. Above all, natural rubber alone, or a combination of natural rubber and SBR is preferably used. When natural rubber and SBR are combined, the ratio by mass of natural rubber to SBR (natural rubber/SBR) is preferably within a range of 50/50 to 90/10, from the viewpoint of suppressing degradation of physical properties owing to reversion of rubber.

Examples of the natural rubber include natural rubber, and modified. natural rubber such as high-purity natural rubber, epoxidated natural rubber, hydroxylated natural rubber, hydrogenated natural rubber and grafted natural rubber that are generally used in the tire industry, for example, TSR (technically specified rubber) and RSS (ribbed smoked sheet) such as SMR (TSR from Malaysia), SIR (TSR from Indonesia), and STR (TSR from Thailand).

As SBR, any ordinary one generally used for tires can be used, and specifically, one having a styrene content of 0.1 to 70% by mass is preferably used, more preferably 5 to 50% by mass, even more preferably 15 to 35% by mass. Also, one having a vinyl content of 0.1 to 60% by mass is preferably used, more preferably 0.1 to 55% by mass.

The weight-average molecular weight (Mw) of SBR is preferably 100,000 to 2,500,000, more preferably 150,000 to 2,000,000, even more preferably 200,000 to 1,500,000. When Mw falls within the range, both workability and mechanical strength can be satisfied. The weight-average molecular weight of SBR is a polystyrene-equivalent weight-average molecular weight thereof measured through gel permeation chromatography (GPC).

As SBR, a modified SBR prepared by introducing a functional group into SBR within a range not interfering with the effect of the present invention can also be used. Examples of the functional group include an amino group, an alkoxysilyl group, a hydroxy group, an epoxy group and a carboxy group.

The rubber composition may further contain a filler in addition to the rubber component. Examples of the filler include inorganic fillers such as carbon black, silica, clay, mica, calcium carbonate, magnesium hydroxide, aluminum hydroxide, barium sulfate, titanium oxide, glass fibers, fibrous fillers, and glass balloons; and organic fillers such as resin particles, wood powder, and cork powder. Contained in the rubber composition, the filler can improve physical properties of the composition such as mechanical strength, heat resistance and weather resistance thereof, can control the hardness thereof, and can increase the amount of rubber.

From the viewpoint of improving physical properties, for example, increasing mechanical strength, carbon black and silica are preferred among the above-mentioned fillers.

Examples of the carbon black include furnace black, channel black, thermal black, acetylene black, and Ketjen black. From the viewpoint of increasing crosslinking speed and mechanical strength, furnace black is preferred among these carbon blacks.

The average particle size of the carbon black is preferably 5 to 100 nm, more preferably 5 to 80 nm, even more preferably 5 to 70 nm. The average particle size of the carbon black can be determined by measuring the diameter of each particle with a transmission electron microscope and calculating the average value of the resultant data.

The silica includes wet-process silica (hydrous silicic acid), dry-process silica Wick anhydride), calcium silicate, aluminum silicate, and the like. Among these types of silica, wet-process silica is preferred.

The average particle size of the silica is preferably 0.5 to 200 nm, more preferably 5 to 150 nm, even more preferably 10 to 100 nm.

The average particle size of the silica can be determined by measuring the diameter of each particle with a transmission electron microscope and calculating the average value of the resultant data.

In the rubber composition, preferably, the filler content is 20 to 150 parts by mass relative to 100 parts by mass of the rubber component, more preferably 25 to 130 parts by mass, even more preferably 25 to 110 parts by mass.

In the case where any other filler than silica and carbon black is used, the content thereof is preferably 20 to 120 parts by mass relative to 100 parts by mass of the rubber component, more preferably 20 to 90 parts by mass, even more preferably 20 to 80 parts by mass.

One alone or two or more kinds of these fillers can be used either singly or as combined.

The rubber composition may further contain a crosslinking agent for crosslinking the rubber component therein. Examples of the crosslinking agent include sulfur, sulfur compounds, oxygen, organic peroxides, phenolic resins, amino resins, quinone and quinone dioxime derivatives, halogen compounds, aldehyde compounds, alcohol compounds, epoxy compounds, metal halide compounds, organic metal halide compounds, and silane compounds. One alone or two or more kinds of these crosslinking agents may he used either singly or as combined. From the viewpoint of mechanical properties of the crosslinked product, the crosslinking agent is contained generally in an amount of 0.1 to 10 parts by mass relative to 100 parts by mass of the rubber component, more preferably 0.5 to 10 parts by mass, even more preferably 0.8 to 5 parts by mass.

In the case where the rubber composition contains sulfur or a sulfur compound as the crosslinking agent for crosslinking (vulcanizing) the rubber component, the composition may further contain a vulcanization accelerator. Examples of the vulcanization accelerator include guanidine compounds, sulfenamide compounds, thiazole compounds, thiuram compounds, thiourea compounds, dithiocarbamate compounds, aldehyde-amine compounds, aldehyde-ammonia compounds, imidazoline compounds, and xanthate compounds. One alone or two or more kinds of these vulcanization accelerators may be used either singly or as combined. The vulcanization accelerator may be contained generally in an amount of 0.1 to 15 parts by mass relative to 100 parts by mass of the rubber component, preferably 0.1 to 10 parts by mass.

In the case where the rubber composition contains sulfur or a sulfur compound as the crosslinking agent for crosslinking (vulcanizing) the rubber component, the composition may further contain a vulcanization aid. Examples of the vulcanization aid include fatty acids such as stearic acid, metal oxides such as zinc oxide, and fatty acid metal salts such as zinc stearate. One alone or two or more kinds of these vulcanization aids may be used either singly or as combined. The vulcanization aid may be contained generally in an amount of 0.1 to 15 parts by mass relative to 100 parts by mass of the rubber component, preferably 1 to 10 parts by mass.

In the case where the rubber composition contains silica as a filler, preferably, the composition further contains a silane coupling agent. Examples of the silane coupling agent include sulfide compounds, mercapto compounds, vinyl compounds, amino compounds, glycidoxy compounds, nitro compounds, and chlorine compounds.

One alone or two or more kinds of these silane coupling agents may be used either singly or as combined. The silane coupling agent may be contained preferably in an amount of 0.1 to 30 parts by mass relative to 100 parts by mass of silica, more preferably 0.5 to 20 parts by mass, even more preferably 1 to 15 parts by mass. When the content of the silane coupling agent falls within the range, dispersibility, coupling effect and reinforcing performance improve.

The rubber composition may optionally contain, as a softening agent, a process oil such as silicone oil, aroma oil, TDAE (treated distilled aromatic extract), MES (mild extracted solvate), RAE (residual aromatic extract), paraffin oil, and naphthene oil, and a resin component such as aliphatic hydrocarbon resin, alicyclic hydrocarbon resin, C9 resin, rosin resin, coumarone-indene resin, and phenolic resin, within a range not interfering with the effect of the present invention and for the purpose of improving workability and fluidity. In the case where the rubber composition contains the process oil as a softening agent, the content thereof is preferably not more than 50 parts by mass relative to 100 parts by mass of the rubber component.

The rubber composition may optionally contain additives such as an antiaging agent, a wax, an antioxidant, a lubricant, a light stabilizer, a scorching inhibitor, a working aid, a colorant such as pigment or dye, a flame retardant, an antistatic agent, a delustering agent, an antiblocking agent, a UV absorbent, a mold release agent, a foaming agent, an antimicrobial agent, a mildew-proofing agent, and a fragrance, within a range not interfering with the effect of the present invention and for the purpose of improving weather resistance, heat resistance and oxidation resistance. Examples of the antioxidant include hindered phenol compounds, phosphorus compounds, lactone compounds and hydroxy compounds. Examples of the antiaging agent include ainine-ketone compounds, imidazole compounds, amine compounds, phenolic compounds, sulfur compounds and phosphorus compounds. One alone or two or more kinds of these additives may be used either singly or as combined.

Regarding the production method for the rubber molded article, for example, the reinforcing fibers are buried in the above-mentioned unvulcanized rubber composition, and then the rubber composition is vulcanized to give a molded article in which the hydrophilic fibers and the rubber component bond via the adhesive component therein.

An example of the hydraulic brake hoses for automobiles is one having an inner rubber layer and an outer rubber layer, in which one or two reinforcing layers containing the reinforcing fibers are arranged between the inner rubber layer and the outer rubber layer.

The rubber component to constitute the inner rubber layer and the outer rubber layer includes those mentioned hereinabove. Above all, the rubber component to constitute the inner rubber layer includes EPDM, SBR and the like, and the rubber component to constitute the outer rubber layer includes EPDM, CR, and the like. The reinforcing layer may be formed by knitting and braiding the reinforcing fibers.

Regarding the production method for the hydraulic brake hoses, a reinforcing layer (first reinforcing layer) formed by knitting and braiding the reinforcing fibers is formed on the outer surface of the inner rubber layer. In the case where two reinforcing layers are formed, an intermediate rubber layer is further formed on the outer surface of the first reinforcing layer, and another reinforcing layer (second reinforcing layer) formed by knitting and braiding the reinforcing fibers may be formed on the outer surface of the intermediate rubber layer. With that, the outer rubber layer is formed on the outer surface of the reinforcing layer (first reinforcing layer or second reinforcing layer), and vulcanized to give the intended hydraulic brake hose.

The vulcanization temperature can be appropriately selected depending on the kind of the constituent material for each layer of the hydraulic brake hose, or the like, and is, from the viewpoint of improving the adhesion force between rubber and the reinforcing fibers while suppressing degradation of the rubber and the reinforcing fibers, preferably 200° C. or lower.

EXAMPLES

Hereinunder the present invention is described further specifically with reference to Examples, but the present invention is not whatsoever restricted by these Examples.
<Production of Modified Conjugated Diene Rubber>
Production of Modified Conjugated Diene Rubber Having Monomer Unit Represented by the Following Formula (1a):

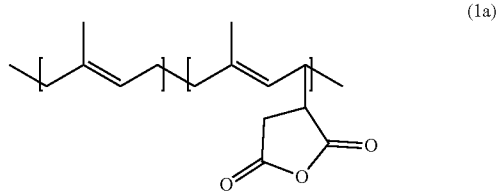

(1a)

Production Example 1: Production of Modified Conjugated Diene Rubber (A-1)

A fully-dried 5-L autoclave was purged with nitrogen, then 1200 g of hexane and 26.2 g of n-butyl lithium (17 mass % hexane solution) were put thereinto, heated up to 50° C., and then with stirring and controlling the polymerization temperature so as to he at 50° C., 1200 g of isoprene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polyisoprene (A'-1).

Subsequently, in a 1-L autoclave purged with nitrogen, 500 g of the resultant unmodified liquid polyisoprene (A'-1) was put, and 25 g of maleic anhydride and 0.5 g of butylated hydroxytoluene (BHT) were added, and reacted at 170° C. for 15 hours to give a maleic anhydride-modified liquid polyisoprene (A-1).

Production Example 2: Production of Modified Conjugated Dime Rubber (A-2)

A fully-dried 5-L autoclave was purged with nitrogen, then 600 g of cyclohexane and 212 g of sec-butyl lithium (10.5 mass % cyclohexane solution) were put thereinto, heated up to 70° C., and then with stirring and controlling the polymerization temperature so as to be 70° C., 2050 g of isoprene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried at 70° C. for 24 hours to give an unmodified liquid polyisoprene (A'-2).

Subsequently, in a 1-L autoclave purged with nitrogen, 500 g of the unmodified liquid polyisoprene (A'-2) produced according to the same process as in Production Example 1 was put, and 50 g of maleic anhydride and 0.5 g of butylated hydroxytoluene (BHT) were added, and reacted at 170° C. for 15 hours to give a maleic anhydride-modified liquid polyisoprene (A-2),
Production of Modified Conjugated Diene Rubber Having Monomer Unit Represented by the Following Formula (1b):

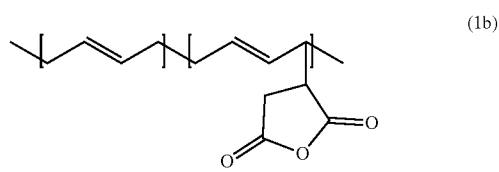

(1b)

Production Example 3: Production of Modified Conjugated Diene Rubber (A-3)

A fully-dried 5-L autoclave was purged with nitrogen, then 1260 g of hexane and 36.3 g of n-butyl lithium (17 mass % hexane solution) were put thereinto, heated up to 50° C., and then with stirring and controlling the polymerization temperature so as to be at 50° C., 1260 g of butadiene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polybutadiene (A'-3).

Subsequently, in a 1-L autoclave purged with nitrogen, 500 g of the resultant unmodified liquid polybutadiene (A'-3) was put, and 25 g of maleic anhydride and 0.5 g of N-phenyl-N'-(1,3-dimethylbutyl)-p-phenylenediamine (trade name "Nocrac 6C", by Ouchi Shinko Chemical Industrial Co., Ltd.) were added, and reacted at 170° C. for 24 hours to give a maleic anhydride-modified liquid polybutadiene (A-3).

Production Example 4: Production of Modified Conjugated Diene Rubber (A-4)

A fully-dried 5-L autoclave was purged with nitrogen, then 1140 g of hexane and 20.9 g of n-butyl lithium (17 mass % hexane solution) were put thereinto, heated up to 50° C., and then with stirring and controlling the polymerization temperature so as to be at 50° C., 1390 g of butadiene was sequentially added and polymerized for 1 hour. Subsequently, methanol was added to stop the polymerization reaction to give a polymer solution. Water was added to the resultant polymer solution and stirred, and the polymer solution was thus washed with water. Stirring was stopped, and after separation of the polymer solution phase from the water phase was confirmed, water was removed. The polymer solution after washing was dried in vacuum at 70° C. for 24 hours to give an unmodified liquid polybutadiene (A'-4).

Subsequently, in a 1-L autoclave purged with nitrogen, 500 g of the resultant unmodified liquid polybutadiene (A'-4) was put, and 15 g of maleic anhydride and 0.5 g of N-phenyl-N'-(1,3-dimethylbutyl)-p-phenylenediamine (trade name "Nocrac 6C", by Ouchi Shinko Chemical Industrial Co., Ltd.) were added, and reacted at 170° C. for 24 hours to give a maleic anhydride-modified liquid polybutadiene (A-4).

Production of Modified Conjugated Diene Rubber Having Monomer Unit Represented by the Following Formula (1c):

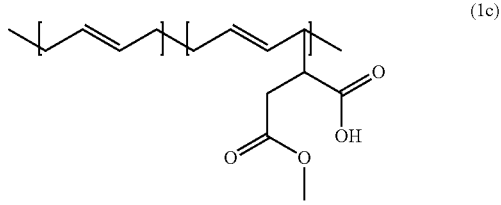

(1c)

Production Example 5: Production of Modified Conjugated Diene Rubber (A-5)

5.4 g of methanol was added to 315 g of maleic anhydride-modified liquid polybutadiene (A-3) obtained according to the same process as in Production Example 3, and reacted at 80° C. for 6 hours to give a monomethyl maleate-modified liquid polyhutadiene (A-5).

Production of Modified Conjugated Diene Rubber Having Monomer Unit Represented by the Following Formula (1d):

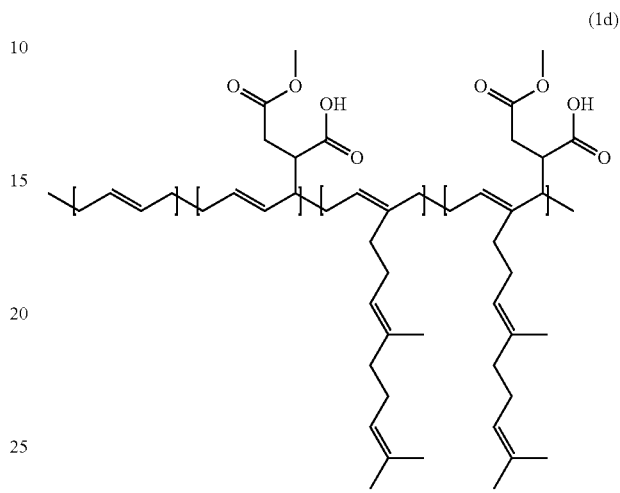

(1d)

Production Example 6: Production of Modified Conjugated Diene Rubber (A-6)

A fully-dried 5-L autoclave was purged with nitrogen, then 1500 g of cyclohexane and 18.2 g of sec-butyl lithium (10.5 mass % cyclohexane solution) were put thereinto, heated up to 50° C., and then 1500 g of a previously-prepared mixture of 900 g of butadiene (a) and 600 g of farnesene (b) (butadiene (a) and farnesene (b) were mixed in a tank) was added at a rate of 10 ml/min, and polymerized for 1 hour. Subsequently, methanol was added to stop the polymerization reaction to give a polymer solution. Water was added to the resultant polymer solution and stirred so as to wash the polymer solution with water. Stirring was stopped, and after separation of the polymer solution phase from the water phase was confirmed, water was removed. The polymer solution after washing was dried in vacuum at 70° C. for 12 hours to give an unmodified liquid polyfarnesene-polybutadiene copolymer (A"-6).

Subsequently, in a 1-L autoclave purged with nitrogen, 500 g of the resultant unmodified liquid polyfarnesene-polybutadiene copolymer (A"-6) was put, and 25 g of maleic anhydride and 0.5 g of N-phenyl-N'-(1,3-dimethylbutyl-p-phenylenediamine (trade name "Nocrac 6C", by Ouchi Shinko Chemical Industrial Co., Ltd.) were added, and reacted at 170° C. for 24 hours to give a maleic anhydride-modified liquid polyfarnesene-polybutadiene copolymer (A'-6). Further, 5.6 g of methanol was added to 300 g of the resultant maleic anhydride-modified liquid polyfarnesene-polybutadiene copolymer (A'-6), and reacted at 80° C. for 6 hours to give a monomethyl maleate-modified liquid polyfarnesene-polybutadiene copolymer (A-6).

Production of Modified Conjugated Diene Rubber Having Monomer Unit Represented by the Following Formula (1e):

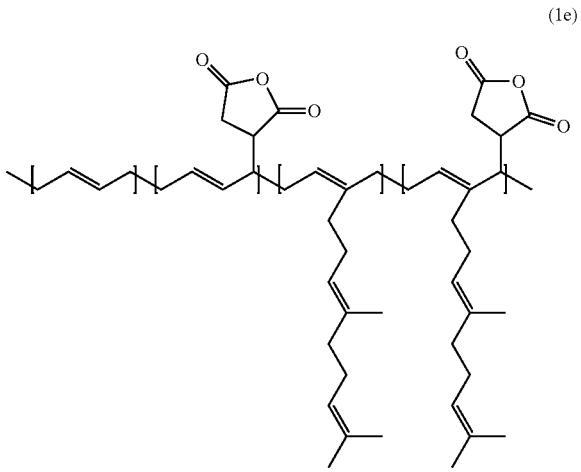

(1e)

Production Example 7: Production of Modified Conjugated Diene Rubber (A-7)

A fully-dried 5-L autoclave was purged with nitrogen, then 1500 g of cyclohexane and 10.5 g of sec-butyl lithium (10.5 mass % cyclohexane solution) were put thereinto, heated up to 50° C., and then 1500 g of a previously-prepared mixture of 600 g of butadiene (a) and 900 g of farnesene (b) (butadiene (a) and farnesene (b) were mixed in a tank) was added at a rate of 10 ml/min, and polymerized for 1 hour. Subsequently, methanol was added to stop the polymerization reaction to give a polymer solution. Water was added to the resultant polymer solution and stirred so as to wash the polymer solution with water. Stirring was stopped, and after separation of the polymer solution phase from the water phase was confirmed, water was removed. The polymer solution after washing was dried in vacuum at 70° C. for 12 hours to give an unmodified liquid polyfarnesene-polybutadiene copolymer (A'-7).

Subsequently, in a 1-L autoclave purged with nitrogen, 500 g of the resultant unmodified liquid polyfarnesene-polybutadiene copolymer (A'-7) was put, and 25 g of maleic anhydride and 0.5 g of N-phenyl-N'-(1,3-dimethylbutyl)-p-phenylenediamine (trade name "Nocrac 6C", by Ouchi Shinko Chemical Industrial Co., Ltd.) were added, and reacted at 170° C. for 24 hours to give a maleic anhydride-modified liquid polyfarnesene-polybutadiene copolymer (A-7).

Measurement methods and calculation methods for the physical properties of modified conjugated diene rubbers are as follows. The results are shown in Table 1.

<Measurement Method for Weight-Average Molecular Weight, Number-Average Molecular Weight and Molecular Weight Distribution>

Mw, Mn and Mw/Mn of the modified conjugated diene rubber were determined as standard polystyrene-equivalent values through GPC (gel permeation chromatography). The apparatus and the condition for measurement are as follows,
Apparatus: GPC apparatus "GPC8020" from. Tosoh Corporation
Separation column: "TSKgel G40001HXL" from Tosoh Corporation
Detector: "RI-8020" from Tosoh Corporation
Eluent: Tetrahydrofuran
Eluent flow rate: 1.0 ml/min
Sample concentration: 5 mg/1.0 ml
Column temperature: 40° C.

<Measurement Method for Melt Viscosity>

The melt viscosity at 38° C. of the modified conjugated diene rubber was measured using a Brookfield viscometer (from Brookfield Engineering Labs. Inc.).

<Measurement Method for Glass Transition Temperature>

10 mg of the modified conjugated diene rubber was put in an aluminum pan, and the thermogram thereof was measured through differential scanning colorimetry (DSC) under a temperature elevation speed condition of 10° C./min, and the peak top value in DDSC was referred to as a glass transition temperature of the rubber.

<Average Number of Hydrogen-Bonding Functional Groups Per Molecule>

The average number of the hydrogen-bonding functional groups per molecule of the modified conjugated diene rubber was calculated from the equivalent (g/eq) of the hydrogen-bonding functional group of the modified conjugated diene rubber and the styrene-equivalent number-average molecular weight Mn thereof, according to the following expression.

Average number of hydrogen-bonding functional groups per molecule=[(number-average molecular weight (Mn))/(molecular weight of styrene unit)×(average molecular weight of conjugated diene and any other optional monomer unit than conjugated diene)]/(equivalent of hydrogen-bonding functional group)

The method for calculating the equivalent of the hydrogen-bonding functional group can be appropriately selected depending on the kind of the hydrogen-bonding functional group.

The average number of the hydrogen-bonding functional groups per molecule of a maleic anhydride-modified conjugated diene rubber and a monomethyl maleate-modified conjugated diene rubber was calculated by determining the acid value of the maleic anhydride-modified conjugated diene rubber and the monomethyl maleate-modified conjugated diene rubber, and calculating the equivalent (g/eq) of the hydrogen-bonding functional group from the acid value.

A modified sample was washed four times with methanol (5 mL per gram of the sample) to remove impurities such as antioxidant, and then the sample was dried under reduced pressure at 80° C. for 12 hours. 180 mL of toluene and 20 mL of ethanol were added to 3 g of the modified sample to dissolve the sample therein, and then this was subjected to neutralization titration with an ethanol solution of 0.1 N potassium hydroxide to determine the acid value thereof according to the following expression.

Acid Value (mgKOH/g)=(A·B)×F×5.611/S

A: Amount (mL) of ethanol solution of 0.1 N potassium hydroxide needed for neutralization.
B: Amount (mL) of ethanol solution of 0.1 N potassium hydroxide in sample-free blank.
F: Titer of ethanol solution of 0.1 N potassium hydroxide.
S: Mass (g) of weighed sample.

From the acid value, the mass of the hydrogen-bonding functional group contained in 1 g of the maleic anhydride-modified conjugated diene rubber or the inonomethyl maleate-modified conjugated diene rubber was calculated according to the following expression, and further the mass (polymer chain mass) except the functional group contained in 1 g of the maleic anhydride-modified conjugated diene rubber or the inonomethyl maleate-modified conjugated diene rubber was calculated. With that, the equivalent of the hydrogen-bonding functional group (g/eq) was calculated according to the following expression.

[Mass of hydrogen-bonding functional group per gram]=[acid value]/[56.11]×[molecular weight of hydrogen-bonding functional group]/1000

[Mass of polymer main chain per gram]=1−[mass of hydrogen-bonding functional group per gram]

[Equivalent of hydrogen-bonding functional group]= [mass of polymer main chain per gran]/([mass of hydrogen-bonding functional group per gram]/[molecular weight of hydrogen-bonding functional group])

following composition, and then squeezed with rollers. Next, the resultant, fibers were dried at 130° C. for 20 seconds, then further heat-treated at 240° C. for 20 seconds and rolled up to give hydrophilized PVA fibers.

<Composition of Hydrophilizing Agent>

Water: 96.96 parts by mass

Meikanate DM-3031 CONC: 22 parts by mass

Denacol EX-614B: 7 parts by mass

The hydrophilizing agent was prepared using a blocked isocyanate and an epoxy resin. As the blocked isocyanate, "Meikanate DM-3031 CONC" by Meisei Chemical Works, Ltd. was used, and as the epoxy resin, "Denacol EX-614B" by Nagase ChemteX Corporation was used.

TABLE 1

| | Modified Conjugated Diene Rubber | Hydrogen-Bonding Functional Group | Mw (×10³) | Mn (×10³) | Molecular Weight Distribution Mw/Mn | Melt Viscosity (38° C.) (Pa · s) | Glass Transition Temperature (° C.) | Average Number of Hydrogen-Bonding Functional Groups per molecule |
|---|---|---|---|---|---|---|---|---|
| A-1 | modified polyisoprene | maleic anhydride group | 34 | 30 | 1.13 | 198 | −59 | 10 |
| A-2 | modified polyisoprene | maleic anhydride group | 13 | 11 | 1.18 | 23 | −55 | 6 |
| A-3 | modified polybutadiene | maleic anhydride group | 29 | 27 | 1.07 | 95 | −89 | 7 |
| A-4 | modified polybutadiene | maleic anhydride group | 47 | 41 | 1.15 | 828 | −89 | 7 |
| A-5 | modified polybutadiene | monomethyl maleate group | 28 | 97 | 1.04 | 197 | −88 | 7 |
| A-6 | modified polyfarnesene-polybutadiene copolymer | monomethyl maleate group | 67 | 52 | 1.28 | 926 | −76 | 17 |
| A-7 | modified polyfarnesene-polybutadiene copolymer | maleic anhydride group | 103 | 81 | 1.27 | 1060 | −73 | 32 |

Example 1

As Example 1, reinforcing fibers having an adhesive component in at least a part of the surfaces of hydrophilic fibers were produced and evaluated as follows.

The modified conjugated diene rubber (A-1) produced as above was mixed with a mineral oil (purity 99.9% or more, flash point 158° C.) in a ratio of 3/7 to give an adhesive component. Using an oiling guide, the adhesive component was applied to PVA fibers ("Kuralon 1239" by Kuraray Co., Ltd., total fineness 1330 dtex, single fiber fineness 6.65 dtex) previously deoiled with acetone, and wound up. The PVA fibers to which the adhesive component had been adhered in that manner were twisted at a twisting number of 80 T/m to give fiber cords.

Examples 2 to 11

Fiber cords were produced according to the same method as in Example 1 except that the adhesive component, the blending ratio of the conjugated diene rubber and the oil, and the deposition amount on the fibers were changed as in Table 2.

Examples 12 and 13

Fiber cords were produced according to the same method as in Example 1 except that the adhesive component, the blending ratio of the conjugated diene rubber and the oil, and the deposition amount on the fibers were changed as in Table 2, and further hydrophilized PVA fibers mentioned below was used as hydrophilic fibers.

Hydrophilization Treatment

Polyvinyl alcohol fibers ("Kuralon 1239" by Kuraray Co., Ltd., total fineness 1330 dtex, single fiber fineness 6.65 dtex) were clipped in an aqueous solution prepared to have the

Comparative Example 1

Fiber cords were produced according to the same method as in Example 1 except that the mixture liquid was not adhered to the PVA fibers.

Comparative Example 2

15 g of an emulsifier (polyoxyethylene alkyl (C=1.2 to 1.5) ether phosphate) (trade name "Phosphanol RS-710" from TOHO Chemical Industry Co., Ltd.) was added to 250 g of the modified conjugated diene rubber (A-1) and stirred for 20 minutes. Subsequently, with stirring, 180 g of an aqueous solution of 0.7 mol/L sodium hydroxide was added little by little. After a predetermined amount of water was added, this was stirred for 20 minutes to give an emulsion of the modified conjugated diene rubber (A-1). Water was further added to the emulsion so as to have a solid concentration of 9%, and then, using an oiling guide, this was applied to polyvinyl alcohol fibers ("Kuralon 1239" by Kuraray Co., Ltd., total fineness 1330 dtex, single fiber fineness 6.65 dtex) previously deoiled with acetone, then dried at 120° C. for 30 seconds, heat-treated at 170° C. for 30 seconds and wound up. The PVA fibers to which the adhesive component had been adhered in that manner were twisted at a twisting number of 80 T/m to give fiber cords.

Comparative Examples 3 to 5

Fiber cords were produced according to the same method as in Example 1 except that xylene, toluene or undecane was used in place of the mineral oil and the blending ratio of the conjugated diene rubber and the oil and the deposition amount on the fibers were changed as in Table 2.

Reference Examples 1 and 2

In Reference Examples 1 and 2, PVA fibers ("Kuralon 1239" by Kuraray Co., Ltd., total fineness 1330 dtex, single fiber fineness 6.65 dtex) was subjected to known RFL treatment in such a manner that the deposition amount could be 2.0% by mass and 4.0% by mass, respectively, and then the fibers were twisted at a twisting number of 80 T/m to give fiber cords. The RFL liquid used here was prepared as follows.

[Composition of RFL Liquid]

Solution A
    Water: 300 parts by mass
    Resorcinol: 22 parts by mass
    Formaldehyde (effective component 37% by mass): 33 parts by mass
    Aqueous sodium hydroxide solution (effective component 10% by mass): 7 parts by mass The solution A was aged at a temperature of 25° C. for 6 hours.

Solution B
    SBR latex (effective component 40% by mass): 43 parts by mass
    Vinylpyridine-modified SBR latex (effective component 40% by mass): 244 parts by mass The solution B was mixed with the aged solution A, and aged at a temperature of 25° C. for 16 hours to produce an RFL liquid. For controlling the deposition amount on fibers, the liquid was diluted by twice with water after the above operation.

<Vapor Pressure of Oil at 20° C.>

The vapor pressure at 20° C. of the mineral oil, the synthetic oil and the fatty acid ester was determined by calculating the constant A, the constant B and the constant C in an Antoine formula: $\log 10P = A - (B/(T+C))$, based on the data measured by a gas flow method.

The vapor pressure at 20° C. of toluene and xylene was directly measured according to a quiescent technique.

<Flash Point of Oil>

The flash point of the mineral oil, the synthetic oil and the fatty acid ester was measured according to a Cleveland open-cup test method in JIS K 2265-4. The flash point of toluene, xylene and undecane was measured according to a tag closed test method in JIS K 2265-1.

<Viscosity at 50° C. of Adhesive Component>

The viscosity at 50° C. of the adhesive component was measured with a rotary B-type viscometer (rotation number 100 rpm) using a mixture previously heated at 50° C. in a water bath.

<Measurement of Adhesive Component Deposition Amount>

The deposition amount of the adhesive component was measured according to the following measurement method.

About 10 g of reinforcing fibers were taken as a sample, and the mass X thereof was measured. The adhesive component was extracted out from the sample, and the extracted mass Y was measured. For extraction, toluene was used as a solvent, and the sample was extracted for 3 hours using a Soxhlet extractor. The deposition amount of the adhesive component was calculated according to the following expression.

Deposition amount of adhesive component (% by mass) on reinforcing fibers=$(Y/X) \times 100$ In addition, the content (% by mass) of the conjugated diene rubber in the adhesive component was calculated from the mass ratio of the conjugated diene rubber in the solid content in the adhesive component. The reinforcing fibers collected using a volatile oil were dried in air through a draft, and after the remaining oil evaporated away, the deposition amount was measured. Accordingly in the case, all the extracted oily component was a conjugated diene rubber.

<Degree of Process Contamination>

In Examples 1 to 13, Comparative Examples 1 to 5, and Reference Examples 1 and 2, the mixture was applied to fibers in the manner as described in each example, and after 5 kg of the reinforcing fibers were wound up, the degree of contamination (gumming up) of holder rollers through which the reinforcing fibers had passed was determined according to the following evaluation standards.

Standards
    G (good): There was no or little roller contamination by gumming up, and there was no problem in yarn-making operation.
    P (poor): There was roller contamination by gumming up, and yarn-making operation was poor.
    B (bad): There was remarkable roller contamination by gumming up, and during yarn-making, single yarns were taken over and insistently twined, and there was a problem in yarn-making operation, <Wear Resistance (Twisting Wear)>

Reinforcing fibers were sampled, and stored at room temperature for 1 month, then the wear resistance thereof was evaluated according to the following method. Reinforcing fibers were twisted in the Z-direction at 80 t/m to form a ring, and at the center part of the ring, this was twisted three times in the S-direction, and while a load of 3 kg was applied thereto, the fibers were rubbed up and down at room temperature and the number of rubbing times before cutting was counted to evaluate the fibers according to the following evaluation standards.

G (good): The fibers were resistant to abrasion of 500 times or more, and were excellent in process passage during working.
    P (poor): The fibers were cut by abrasion of 100 times or more and less than 500 times, and were poor in process passage during working.
    B (bad): The fibers were cut by abrasion of less than 100 times, and there was a problem in process passage during working, <Measurement of Rubber Adhesion Force>

The fiber cords produced in Examples 1 to 13, Comparative Examples 1 to 5, and Reference Examples 1. and 2 were formed into evaluation sheets according to the method described below. In the evaluation sheet, the fiber cord was peeled from the rubber in a mode of T-type peel, and the force (N/25.4 mm) needed for the peel was measured to be a rubber adhesion force. The results are shown in Table 2. Regarding the evaluation results of the rubber adhesion force, a larger value means a higher adhesion force between reinforcing fibers and rubber.

The evaluation sheets were produced as follows.

Production of Evaluation Sheet

The fiber cords produced in the above Examples, Comparative Examples and Reference Example were individually aligned and fixed on a masking tape like a bamboo curtain thereon in such a manner that the fiber cords could not overlap with each other. This was overlaid on an unvulcanized rubber composition containing EPDM rubber ("Esprene 501A" from Sumitomo Chemical Co., Ltd.) as the main ingredient and prepared according to the formulation mentioned below using EPDM rubber (hereinafter this may also be referred to as "EPDM unvulcanized rubber") (width 25.4 mm, length 240 mm). (The length of the overlapped part of the fiber cord and the EPDM unvulcanized rubber was 190 mm.) Next, this was vulcanized by pressing at 150° C. and under the pressure of 20 kg/cm² for 30 minutes to produce an evaluation sheet.

(Blending Formulation of EPDM Unvulcanized Rubber)

EPDM rubber: 100 part by mass
Filler (carbon black): 60 parts by mass
Softening agent (paraffin-based process oil): 20 parts by mass
Crosslinking agent (sulfur powder): 1.5 parts by mass
Vulcanization aid (two kinds of zinc oxide, stearic acid): 6 parts by mass
Vulcanization accelerator (thiazole-based, thiuram-based): 1.5 parts by mass

TABLE 2

| | | Adhesive Component | | | | | | Deposition Amount of Adhesive Component (% by mass) | | |
|---|---|---|---|---|---|---|---|---|---|---|
| | | | Oil (O) | | | | | | | |
| | Fibers | Conjugated Diene Rubber (R) kind | kind | 20° C. vapor pressure (Pa) | Flash Point (° C.) | volatility | R/O by mass | 50° C. viscosity (Pa · s) | total | conjugated diene rubber | oil |
| Example 1 | PVA fibers | A-1 | mineral oil | $7.0 \times 10^{-3}$ | 158 | no | 3:7 | 27.1 | 1.80 | 0.54 | 1.26 |
| Example 2 | PVA fibers | A-1 | mineral oil | $7.0 \times 10^{-3}$ | 158 | no | 1:9 | 2.7 | 2.10 | 0.21 | 1.89 |
| Example 3 | PVA fibers | A-1 | synthetic oil A (*1) | 3.0 | 113 | no | 3:7 | 12.3 | 2.00 | 0.60 | 1.40 |
| Example 4 | PVA fibers | A-1 | mineral oil | $1.1 \times 10^{-3}$ | 222 | no | 3:7 | 81.0 | 1.40 | 0.42 | 0.98 |
| Example 5 | PVA fibers | A-1 | POE (*2) | $1.7 \times 10^{-3}$ | 258 | no | 3:7 | 63.2 | 1.30 | 0.39 | 0.91 |
| Example 6 | PVA fibers | A-1 | synthetic oil (*3) | $3.6 \times 10^{-3}$ | 255 | no | 3:7 | 82.5 | 1.30 | 0.36 | 0.94 |
| Example 7 | PVA fibers | A-2 | mineral oil | $7.0 \times 10^{-3}$ | 158 | no | 5:5 | 12.4 | 1.90 | 0.95 | 0.95 |
| Example 8 | PVA fibers | A-2 | mineral oil | $7.0 \times 10^{-3}$ | 158 | no | 7:3 | 93.2 | 1.40 | 0.98 | 0.42 |
| Example 9 | PVA fibers | A-3 | mineral oil | $7.0 \times 10^{-3}$ | 158 | no | 3:7 | 32.1 | 1.70 | 0.51 | 1.19 |
| Example 10 | PVA fibers | A-4 | mineral oil | $7.0 \times 10^{-3}$ | 158 | no | 2:8 | 65.3 | 1.56 | 0.30 | 1.26 |
| Example 11 | PVA fibers | A-5 | mineral oil | $7.0 \times 10^{-3}$ | 158 | no | 3:7 | 49.1 | 1.80 | 0.54 | 1.26 |
| Example 12 | hydrophilized PVA fibers | A-6 | POE (*2) | $1.7 \times 10^{-3}$ | 258 | no | 2:8 | 77.4 | 1.74 | 0.35 | 1.39 |
| Example 13 | hydrophilized PVA fibers | A-7 | POE (*2) | $1.7 \times 10^{-3}$ | 258 | no | 3:17 | 71.2 | 1.86 | 0.28 | 1.39 |
| Comparative Example 1 | PVA fibers | — | — | — | — | — | — | — | — | — | — |
| Comparative Example 2 | PVA fibers | — | — | — | — | — | — | 0.3 | 0.84 | 0.84 | 0.00 |
| Comparative Example 3 | PVA fibers | A-1 | xylene | $8.0 \times 10^{2}$ | 25 | yes | 3:7 | 4.5 | 0.55 | 0.55 | 0.00 |
| Comparative Example 4 | PVA fibers | A-1 | toluene | $2.9 \times 10^{2}$ | 4.4 | yes | 3:7 | 3.7 | 0.64 | 0.64 | 0.00 |
| Comparative Example 5 | PVA fibers | A-1 | undecane | $6.0 \times 10$ | 60 | yes | 3:7 | 9.4 | 0.71 | 0.71 | 0.00 |
| Reference Example 1 | PVA fibers | — | — | — | — | — | — | — | 2.00 (*4) | — | — |
| Reference Example 2 | PVA fibers | — | — | — | — | — | — | — | 4.00 (*4) | — | — |

| | Degree of Process contamination | Weat Resistance | Rubber Adhesion Force (N/25.4 mm) |
|---|---|---|---|
| Example 1 | G | G | 31.7 |
| Example 2 | G | G | 29.4 |
| Example 3 | G | G | 25.5 |
| Example 4 | G | G | 30.4 |
| Example 5 | G | G | 27.3 |
| Example 6 | G | G | 29.1 |
| Example 7 | G | G | 25.2 |
| Example 8 | G | G | 26.7 |
| Example 9 | G | G | 33.6 |
| Example 10 | G | G | 29.9 |
| Example 11 | G | G | 26.8 |
| Example 12 | G | G | 32.4 |
| Example 13 | G | G | 31.7 |
| Comparative Example 1 | G | G | 8.8 |
| Comparative Example 2 | B | B | 21.4 |
| Comparative Example 3 | P | B | 18.4 |
| Comparative Example 4 | P | B | 19.0 |

TABLE 2-continued

|  |  |  |  |
|---|---|---|---|
| Comparative Example 5 | P | P | 24.3 |
| Reference Example 1 | — | — | 23.2 |
| Reference Example 2 | — | — | 28.9 |

\*1: 1-Tetradecene (Linealene 14 by Idemitsu Kosan Co., Ltd.)
\*2: Polyol fatty acid ester (trimethylolpropane tricaprylate)
\*3: Poly-α-olefin (FGC32 by Anderol Corporation)
\*4: Deposition amount of RFL Example 14

Fiber cords were produced according to the same method as in Example 1 except that hydrophilized polyester fibers of PET fibers to be mentioned below were used as hydrophilic fibers.

Comparative Example 6

Fiber cords were produced according to the same method as in Comparative Example 1. except that hydrophilized polyester fibers of PET fibers to he mentioned below were used as hydrophilic fibers.

Reference Example 3

Fiber cords were produced according to the same method as in Reference Example 1 except that hydrophilized polyester fibers of PET fibers to be mentioned below were used as hydrophilic fibers.

<Hydrophilization Treatment>

Polyester fibers, PET fibers ("702C" by Toray Co., Ltd., total fineness 1670 dtex, single fiber fineness 5.80 dtex) were dipped in an aqueous solution prepared to have the following composition, and then squeezed with rollers. Next, the resultant fibers were dried at 130° C. for 60 seconds, then further heat-treated at 240° C. for 60 seconds and rolled up to give hydrophilized PET fibers.

[Composition of Hydrophilizing Agent]
Water: 96.96 parts by mass
Meikanate DM-3031 CONC: 22 parts by mass
Denacol EX-614B: 7 parts by mass The hydrophilizing agent was prepared using a blocked isocyanate and an epoxy resin. As the blocked isocyanate, "Meikanate DM-3031 CONC" by Meisei Chemical Works, Ltd. was used, and as the epoxy resin, "Denacol EX-614B" by Nagase ChemteX Corporation was used.

<Measurement of Rubber Adhesion Force>

The fiber cords produced in Example 14, Comparative Example 6 and Reference Example 3 were tested according to the same method as above to measure and evaluate the rubber adhesion force, except that an unvulcanized rubber composition mainly consisting of NR/SBR (hereinafter also referred to "unvulcanized NR/SBR rubber") was used in place of the unvulcanized. EPDM rubber. The results are shown in Table 3.

<Degree or Process Contamination>

Example 14, Comparative Example 6 and Reference Example 3 were evaluated for the degree of process contamination according to the same method as above. The results are shown in Table 3.

<Wear Resistance (Twisting Wear)>

Example 14, Comparative Example 6 and Reference Example 3 were evaluated for the wear resistance according to the same method as above. The results are shown in Table 3.

TABLE 3

| | | Adhesive Component | | | | | | Deposition Amount of Adhesive Component (% by mass) | | |
|---|---|---|---|---|---|---|---|---|---|---|
| | | Conjugated Diene Rubber (R) kind | Oil (O) | | | | | | | |
| | Fibers | | kind | 20° C. vapor pressure (Pa) | Flash Point (° C.) | volatility | R/O by mass | 50° C. viscosity (Pa · s) | total | conjugated diene rubber | oil |
| Example 14 | Hydrophilized PET | A-1 | mineral oil | $1.7 \times 10^{-3}$ | 158 | no | 2.5:7.5 | 27.1 | 1.80 | 0.45 | 1.35 |
| Comparative Example 6 | Hydrophilized PET | — | — | — | — | — | — | — | — | — | — |
| Reference Example 3 | Hydrophilized PET | — | — | — | — | — | — | — | 4.00 (\*4) | — | — |

| | Degree of Process contamination | Weat Resistance | Rubber Adhesion Force (N/25.4 mm) |
|---|---|---|---|
| Example 14 | G | G | 130.8 |
| Comparative Example 6 | G | G | 8.8 |

TABLE 3-continued

| | | | |
|---|---|---|---|
| Reference Example 3 | — | — | 91.4 |

*4: Deposition amount of RFL

As obvious from the results of Examples and Comparative Examples, the reinforcing fibers of the present invention can be reinforcing fibers excellent in adhesiveness to rubber, without using an adhesive agent that contains a resorcinol-formaldehyde resin and a rubber latex as main ingredients. Also according to the present invention, reinforcing fibers can be produced efficiently while suppressing contamination of production facilities.

The invention claimed is:

1. Reinforcing fibers, comprising:
   fibers; and
   an adhesive component;
   wherein:
   the adhesive component comprises a conjugated diene rubber and an oil;
   the viscosity of the adhesive component measured at 50° C. is 500 Pa·s or less;
   the adhesive component is present in at least a part of surfaces of the fibers; and
   a vapor pressure of the oil at 20° C. is 10 Pa or less.

2. The reinforcing fibers according to claim 1, wherein:
   the fibers comprise hydrophilic fibers; and
   the hydrophilic fibers comprise at least one selected from group consisting of polyvinyl alcohol fibers, regenerated cellulose fibers, and fibers prepared by hydrophilizing surfaces of hydrophobic fibers.

3. The reinforcing fibers according to claim 2, wherein the adhesive component is present in the reinforcing fibers in an amount of 0.01 to 10 parts by mass relative to 100 parts by mass of the fibers, and the viscosity of the adhesive component measured at 50° C. is 250 Pa·s or less.

4. The reinforcing fibers according to claim 1, wherein the conjugated diene rubber is liquid.

5. The reinforcing fibers according to claim 1, Wherein the conjugated diene rubber comprises monomer units derived from at least one selected from the group consisting of butadiene, isoprene, and farnesene.

6. The reinforcing fibers according to claim 1, wherein a melt viscosity of the conjugated diene rubber at 38° C. is 4,000 Pa·s or less.

7. The reinforcing fibers according to claim 1, wherein a number-average molecular weight (Mn) of the conjugated diene rubber is 2,000 to 120,000.

8. The reinforcing fibers according to claim 1, wherein the conjugated diene rubber is a modified conjugated diene rubber comprising a hydrogen-bonding functional group.

9. The reinforcing fibers according to claim 8, wherein the hydrogen-bonding functional group is at least one selected from the group consisting of a hydroxy group, an aldehyde group, an acetalized form of an aldehyde group, a carboxy group, a salt of a carboxy group, an ester form of a carboxy group, an acid anhydride of a carboxy group, a silanol group, an ester form of a silanol group, an amino group, an imidazole group, and a mercapto group.

10. The reinforcing fibers according to claim 1, wherein the adhesive component is present in the reinforcing fibers in an amount of 0.01 to 10 parts by mass relative to 100 parts by mass of the fibers.

11. The reinforcing fibers according to claim 1, wherein the adhesive component comprises the conjugated diene rubber in an amount of 1% to 80% by mass.

12. The reinforcing fibers according to claim 1, wherein the adhesive component comprises the oil in an amount of 20% to 90% by mass.

13. The reinforcing fibers according to claim 1, wherein a flash point of the oil is 70° C. or higher.

14. A method for producing the reinforcing fibers of claim 1, comprising adhering a mixture of the conjugated diene rubber and the oil to the fibers.

15. A fabric comprising the reinforcing fibers of claim 1, wherein the fabric is a woven fabric or a knitted fabric.

16. A molded article obtained by molding a composition comprising the reinforcing fibers of claim 1.

17. The molded article according to claim 16, wherein the composition further comprises a rubber component.

18. The molded article according to claim 16, wherein the molded article is in the form of a tire, a belt, or a hose.

19. The reinforcing fibers according to claim 1, wherein the viscosity of the adhesive component measured at 50° C. is 250 Pa·s or less.

* * * * *